(12) United States Patent
Obayashi et al.

(10) Patent No.: US 12,378,620 B2
(45) Date of Patent: Aug. 5, 2025

(54) QUENCHING METHOD

(71) Applicant: AISIN CORPORATION, Aichi (JP)

(72) Inventors: Koji Obayashi, Kariya (JP); Daisuke Kasai, Kariya (JP); Keisuke Matsuzaka, Kariya (JP); Takeshi Naito, Yokohama (JP); Takeshi Ryujin, Anjo (JP); Toshiaki Matsumura, Anjo (JP)

(73) Assignee: AISIN CORPORATION, Aichi (JP)

( * ) Notice: Subject to any disclaimer, the term of this patent is extended or adjusted under 35 U.S.C. 154(b) by 188 days.

(21) Appl. No.: 17/420,581

(22) PCT Filed: Mar. 16, 2020

(86) PCT No.: PCT/JP2020/011471
§ 371 (c)(1),
(2) Date: Jul. 2, 2021

(87) PCT Pub. No.: WO2020/203226
PCT Pub. Date: Aug. 10, 2020

(65) Prior Publication Data
US 2022/0106653 A1   Apr. 7, 2022

(30) Foreign Application Priority Data

Mar. 29, 2019   (JP) ................... 2019-066074

(51) Int. Cl.
*C21D 1/18* (2006.01)
*C21D 1/58* (2006.01)
(Continued)

(52) U.S. Cl.
CPC .............. *C21D 1/18* (2013.01); *C21D 1/58* (2013.01); *C21D 1/60* (2013.01); *C21D 1/64* (2013.01); *C21D 2211/008* (2013.01)

(58) Field of Classification Search
CPC ... C21D 1/18; C21D 1/58; C21D 1/60; C21D 1/64
See application file for complete search history.

(56) References Cited

U.S. PATENT DOCUMENTS

| | | | | |
|---|---|---|---|---|
| 2,639,047 A | * | 5/1953 | Insen | ................... C21D 9/0018 266/132 |
| 5,902,423 A | * | 5/1999 | Pugh | ...................... B02C 17/20 148/333 |
| 2016/0273063 A1 | * | 9/2016 | Valdez | ..................... C21D 9/08 |

FOREIGN PATENT DOCUMENTS

| | | | |
|---|---|---|---|
| EP | 621344 B1 * | 6/1999 | ............... C21D 1/64 |
| JP | 6-002030 A | 1/1994 | |

(Continued)

OTHER PUBLICATIONS

International Search Report for PCT/JP2020/011471 dated Jun. 16, 2020 (PCT/ISA/210).

*Primary Examiner* — Jonathan Johnson
*Assistant Examiner* — Maxwell Xavier Duffy
(74) *Attorney, Agent, or Firm* — Sughrue Mion, PLLC

(57) ABSTRACT

Provided is a method for executing a quenching method in which an object to be treated that is a quenching target is cooled with a quenching coolant that is a coolant for quenching, in which the object to be treated is moved inside the quenching coolant accumulated in a cooling tank, by a moving device for moving the object to be treated, and at least from when the object to be treated comes into contact with the quenching coolant until a surface of the object to be treated undergoes martensitic transformation, a state in which a relative speed of the object to be treated and the quenching coolant is slower than a moving speed of the object to be treated is maintained.

12 Claims, 9 Drawing Sheets

(51) Int. Cl.
*C21D 1/60* (2006.01)
*C21D 1/64* (2006.01)

(56) References Cited

FOREIGN PATENT DOCUMENTS

| | | | |
|---|---|---|---|
| JP | H062030 A | * | 1/1994 |
| JP | 6-33135 A | | 2/1994 |
| JP | 2004-83930 A | | 3/2004 |
| JP | 2011-6771 A | | 1/2011 |
| JP | 2016-69682 A | | 5/2016 |
| JP | 2016-108584 A | | 6/2016 |

* cited by examiner

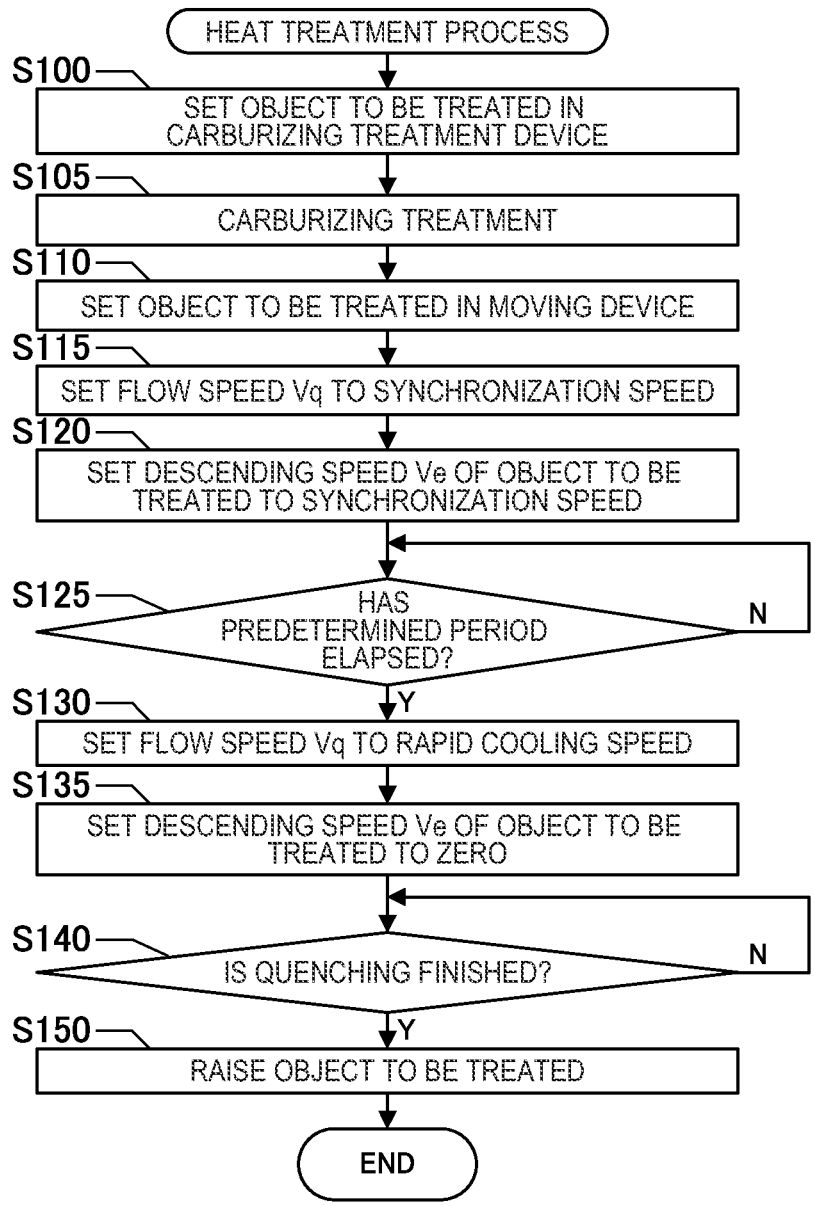

|  | COMPARATIVE EXAMPLE (HOT OIL) | EXAMPLE 1 (HOT OIL) | EXAMPLE 2 (COLD OIL) | EXAMPLE 3 (WATER) |
|---|---|---|---|---|
| QUENCHING TEMPERATURE | 850°C | 850°C | 850°C | 850°C |
| $V_e$ | 200mm/s | 200mm/s | 200mm/s | 200mm/s |
| $V_q$ | 200mm/s | 200mm/s | 200mm/s | 200mm/s |
| QUENCHING COOLANT TEMPERATURE | 120°C | 120°C | 80°C | NORMAL TEMPERATURE |
| SYNCHRONIZATION TIME | — | 280s | 260s | 10s |
| DISTORTION AMOUNT | 6μm | 1μm | 1μm | 1μm |
| SURFACE HARDNESS | Hv798 | Hv799 | Hv801 | Hv808 |
| EFFECTIVE CURING DEPTH | 1.2mm | 1.2mm | 1.4mm | 1.8mm |
| INTERNAL HARDNESS | Hv268 | Hv267 | Hv272 | Hv350 |

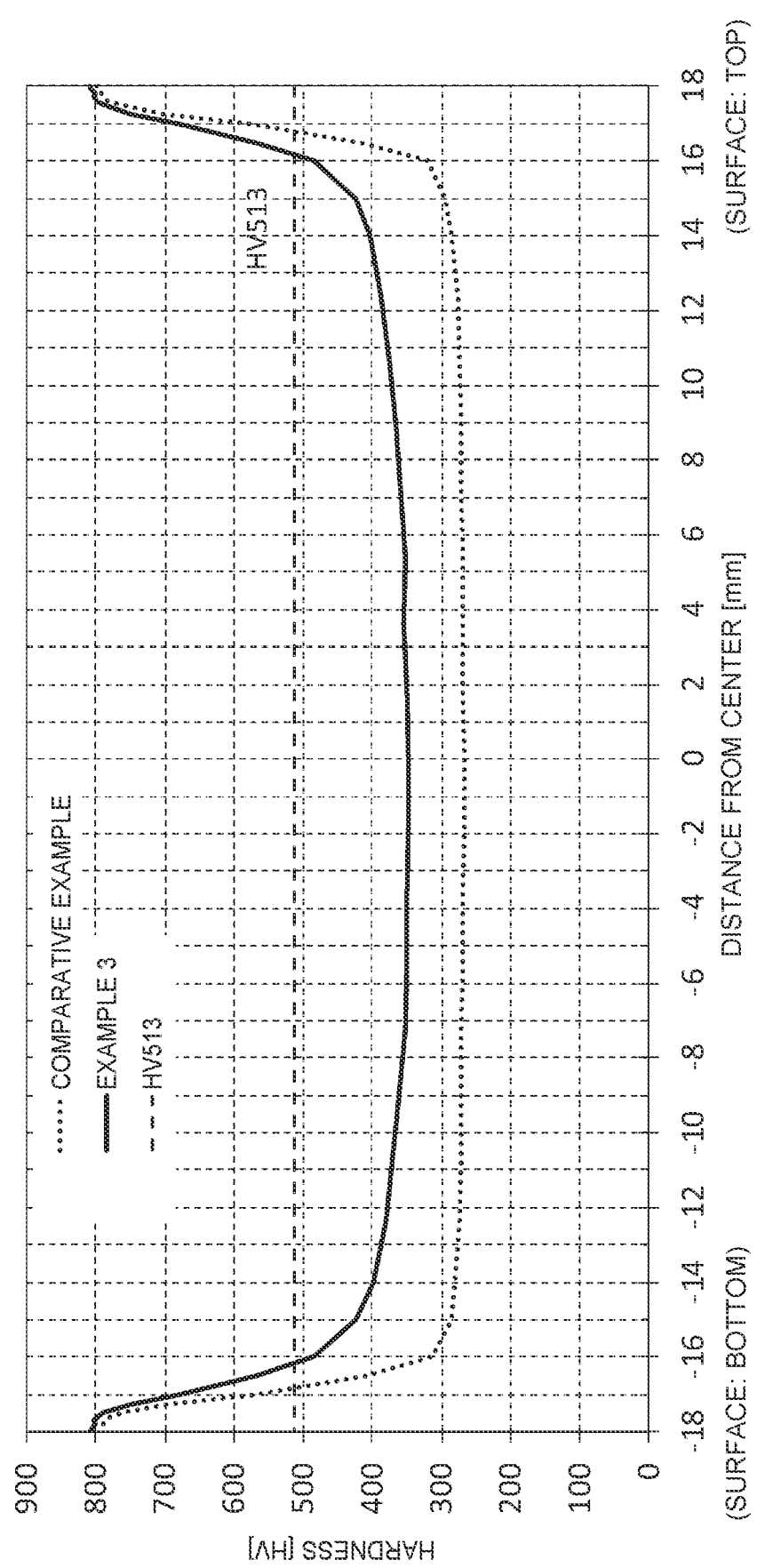

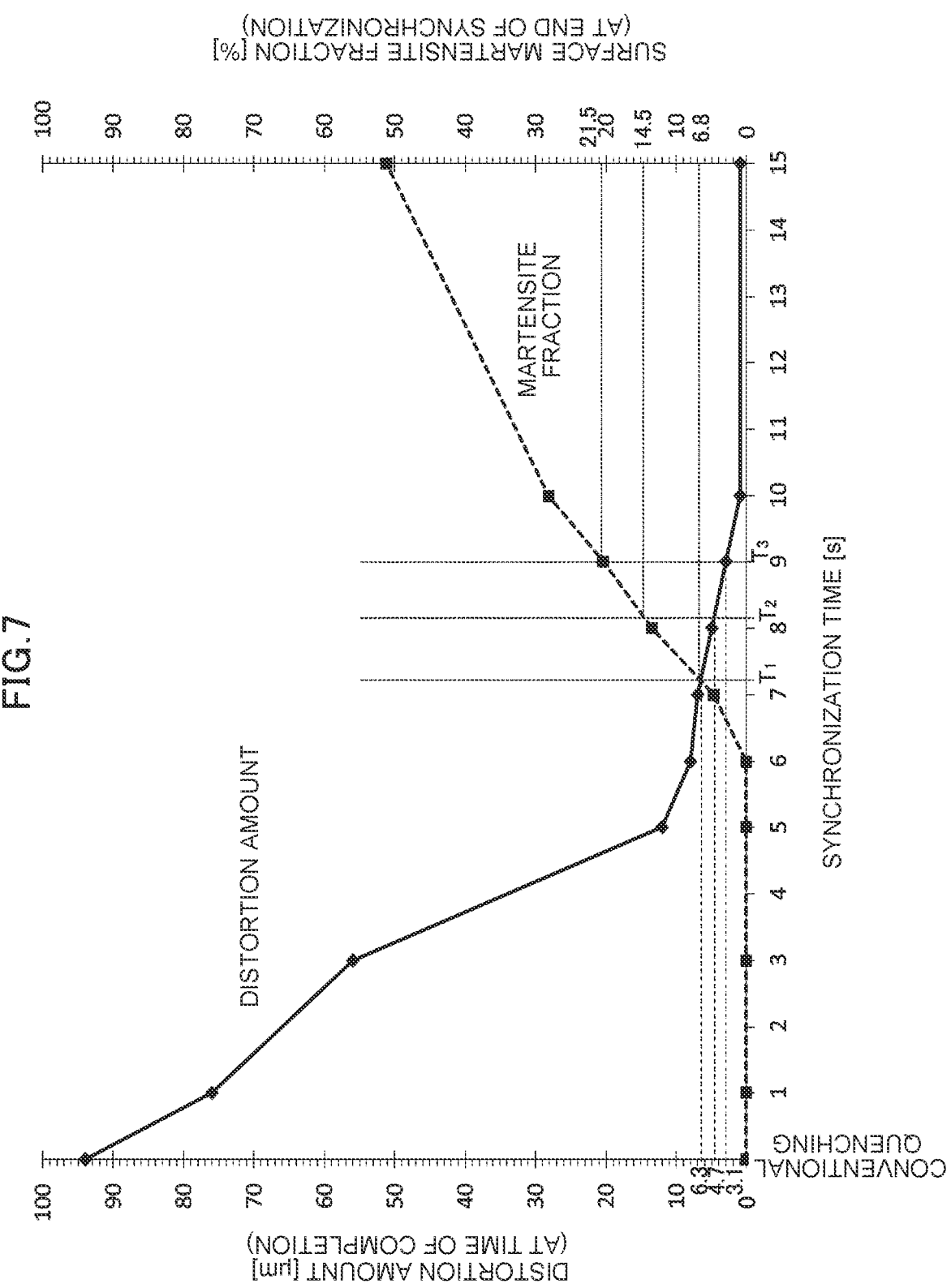

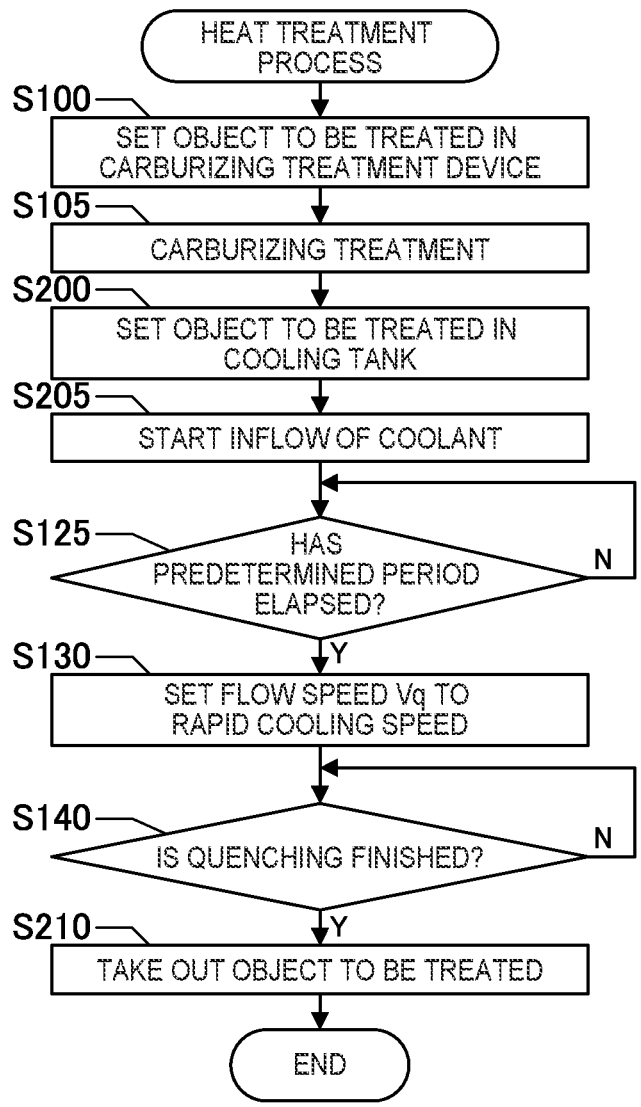
FIG.9A
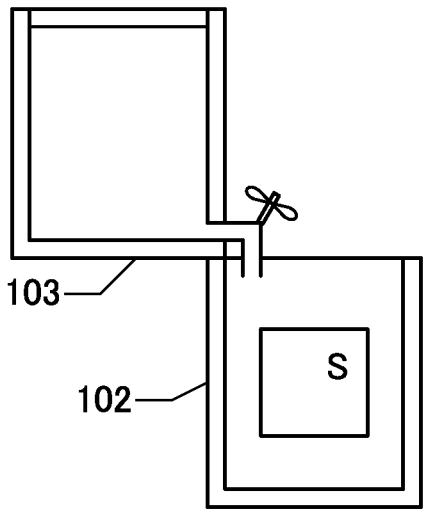
FIG.9B
FIG.9C
|  | SAMPLE A (WATER) | SAMPLE B (WATER) |
|---|---|---|
| QUENCHING TEMPERATURE | 850°C | 850°C |
| Ve | 200mm/s | 200mm/s |
| SHOWER TIME | – | 1 SECOND |
| QUENCHING COOLANT TEMPERATURE | NORMAL TEMPERATURE | NORMAL TEMPERATURE |
| POST-IMMERSION DISTORTION AMOUNT | 22 μm | 1 μm |
| POST-QUENCHING DISTORTION AMOUNT | 94 μm | 0.7 μm |

QUENCHING METHOD

CROSS REFERENCE TO RELATED APPLICATIONS

This application is a National Stage of International Application No. PCT/JP2020/011471 filed Mar. 16, 2020, claiming priority based on Japanese Patent Application No. 2019-066074 filed Mar. 29, 2019, the entire contents of which are incorporated in their entirety.

TECHNICAL FIELD

The present disclosure relates to a quenching method.

BACKGROUND ART

Conventionally, there is known a quenching method in which an object to be treated that is a quenching target is immersed in a coolant and cooled to a temperature equal to or lower than a martensitic transformation temperature. Examples of such a quenching technique include Patent Document 1, for example.

RELATED ART DOCUMENTS

Patent Documents

Patent Document 1: Japanese Unexamined Patent Application Publication No. 6-2030 (JP 6-2030 A)

SUMMARY OF THE DISCLOSURE

Problem to be Solved by the Various Aspects of the Disclosure

When the object to be treated is immersed in the coolant, since the part that is in contact with the coolant at the start of immersion is cooled before the part that is in contact with the coolant at the stage of completion of immersion, a temperature difference occurs between the parts on a surface of the object to be treated that is cooled in the coolant. When there is a temperature difference between the parts on the surface, the object to be treated becomes distorted since the degree of thermal expansion differs between the parts. When cooling is proceeded and martensite is formed on the surface of the object to be treated in a state in which there is a temperature difference, the surface of the object to be treated becomes hard and the distortion cannot be moderated. As a result, quenching is completed with distortion.

The present disclosure has been made in view of the above problems. The object is to increase the possibility that distortion can be suppressed.

Means for Solving the Problem

Adopted is a configuration of a quenching method in which an object to be treated that is a quenching target is cooled with a quenching coolant that is a coolant for quenching, in which the object to be treated is moved inside the quenching coolant accumulated in a cooling tank, by a moving device for moving the object to be treated, and at least from when the object to be treated comes into contact with the quenching coolant until a surface of the object to be treated undergoes martensitic transformation, a state in which a relative speed of the object to be treated and the quenching coolant is slower than a moving speed of the object to be treated is maintained.

That is, in a state in which the object to be treated that is a quenching target is in contact with the quenching coolant, the object to be treated is cooled by transferring heat from the object to be treated to the quenching coolant around the object to be treated. Thus, when the quenching coolant around the object to be treated that has been warmed by the heat transfer is moved by stirring or the like and the quenching coolant around the object to be treated is replaced with the low-temperature quenching coolant, heat exchange is promoted and cooling is progressed.

Specifically, when the object to be treated is moved into the quenching coolant by the moving device, a temperature difference occurs between the part that is in contact with the liquid surface of the quenching coolant first and the part that is in contact with the liquid surface last. When the quenching coolant around the object to be treated is replaced with a low-temperature quenching coolant in the state in which the temperature difference is generated in this way, heat exchange is promoted and cooling of the first contacted part is promoted.

When the object to be treated is moved by the moving device, when the quenching coolant is in a stationary state, since the quenching coolant around the object to be treated is replaced with the low-temperature quenching coolant as the object to be treated is moved, cooling is progressed. When the surface of the object to be treated undergoes martensitic transformation while the distortion caused by the temperature difference of the object to be treated is maintained, the surface of the object to be treated is hardened and fixed in a state in which the distortion is not eliminated. Therefore, the distortion remains even after the quenching is completed.

However, in a state in which the relative speed of the object to be treated and the quenching coolant is slower than the moving speed of the object to be treated, the degree to which the quenching coolant around the object to be treated is replaced by the low-temperature quenching coolant is diminished, compared to a state in which the quenching coolant is stationary. Then, although rapid cooling is started by the quenching coolant as to the object to be treated that is in contact with the quenching coolant, the quenching coolant that is in contact with the object to be treated gradually warms up, and the warmed quenching coolant tends to be present around the object to be treated. Thus, although the cooling speed at the part in which cooling is started at the initial stage is gradually decreased, the quenching coolant around the part in which cooling is started later is not warmed, and the state is such that the cooling speed at the part in which cooling is started later is higher. As a result, the distortion generated in the object to be treated is smaller than that of the configuration in which the quenching coolant around the object to be treated is replaced.

In contrast, since the object to be treated becomes hard when the surface of the object to be treated undergoes martensitic transformation, even if rapid cooling is promoted thereafter, distortion is unlikely to occur after quenching. Thus, when the configuration is such that cooling is moderated by having the relative speed of the object to be treated and the quenching coolant maintained at a slower speed than the moving speed of the object to be treated at least until the surface of the object to be treated undergoes martensitic transformation, the possibility that the distortion remaining on the object to be treated after quenching can be suppressed can be increased.

BRIEF DESCRIPTION OF THE DRAWINGS

FIG. 3 is a flowchart showing a heat treatment process.

FIG. 4 is a diagram showing a comparative example and embodiments.

FIG. 5 is a diagram showing the hardness of an object to be treated.

FIG. 7 is a diagram showing a relationship between the martensite fraction and a distortion amount.

FIG. 9A is a flowchart showing the heat treatment process, FIG. 9B is a diagram showing an example of a device for carrying out the quenching method, and FIG. 9C is a diagram showing the effect of pre-cooling.

DETAILED DESCRIPTION

Here, embodiments of the present disclosure will be described in the following order.
(1) Configuration of a device that carries out a quenching method:
(2) Heat treatment process:
(3) Embodiment:
(4) Other embodiments:

(1) Configuration of a Device that Carries Out a Quenching Method

Figure 1A:
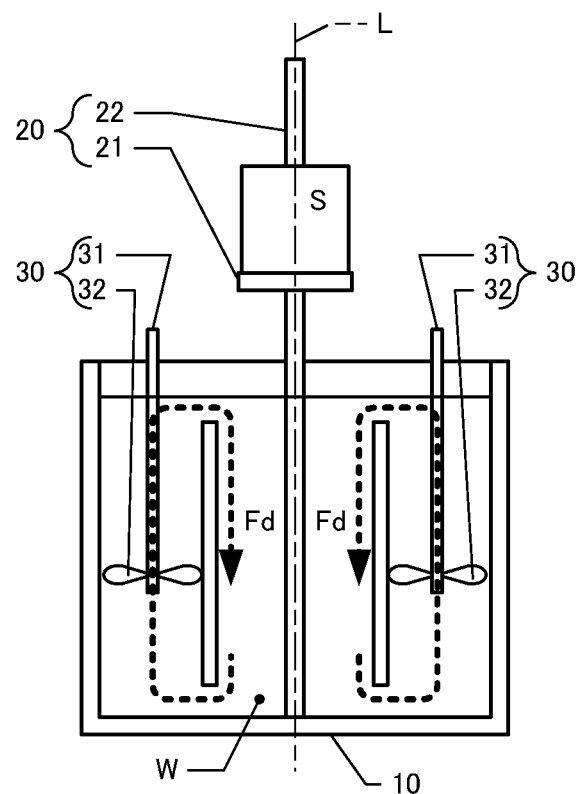
FIG. 1A is a diagram schematically showing a device for carrying out a quenching method.

FIG. 1A is a diagram schematically showing a device for carrying out a quenching method according to an embodiment of the present disclosure. FIG. 1A shows a main portion of the device, and various configurations can be adopted as a mechanism for driving each portion, the shape of each portion, and the like. The device shown in FIG. 1A includes a cooling tank 10 formed by opening a surface of a hollow rectangular parallelepiped. In the present embodiment, a quenching coolant W is accumulated in advance in the cooling tank 10. The quenching coolant W may be a substance that can exchange heat with the object to be treated. In the present embodiment, the quenching coolant W is water. Of course, the quenching coolant may be an aqueous solution in which various materials are dissolved in water.

In the present embodiment, the device that carries out the quenching method is provided with a moving device 20 that raises and lowers an object S to be treated. The moving device 20 includes a support base 21 and a support portion 22, and the object S to be treated is placed on the support base 21. The support base 21 is supported by the support portion 22 extending in a height direction of the cooling tank 10. A drive source such as a motor not shown is connected to the support portion 22, and the support base 21 can be moved up and down by a raising and lowering mechanism not shown. Of course, a drive source such as a motor may be driven by various types of energy, and various types of energy such as electric, hydraulic drive, and atmospheric pressure drive can be used. Further, a power transmission mechanism is not limited to a motor or the like, and may be a linear motor or the like (the same applies hereinafter). Further, various configurations can be adopted for raising and lowering the object S to be treated.

In the present embodiment, the drive source can change an ascending/descending speed of the support base 21 on which the object S to be treated is placed, and by changing a control signal for the drive source, the ascending speed of the support base 21 and the descending speed of the support base 21 can be specified. The support portion 22 is extended in a vertical direction from a bottom surface of the cooling tank 10 toward an opening portion side. Thus, a lower part of the support portion 22 is immersed in the quenching coolant W in the cooling tank 10, and the support base 21 is moved up and down. Therefore, the object S to be treated that is on the support base 21 can be immersed in the quenching coolant W and the object S to be treated in the quenching coolant W can be taken outside.

The number and placement (orientation) of the object S to be treated placed on the support base 21 may be in various modes. For example, a pallet may be attached to the support base 21, and a plurality of objects S to be treated may be arranged in the pallet. In the present specification, the case in which there is one object S to be treated will be described as an example. Of course, the support base 21, the support portion 22, and the like may have various characteristics. For example, the support base 21 may be formed in a mesh or a grid shape so that the support base 21 can be easily lowered.

In the cooling tank 10, flow devices 30 making the quenching coolant W flow are provided. The flow devices 30 each have a shaft 31 and a propeller 32. That is, in the cooling tank 10, the shafts 31 that are extended along a side surface are provided near the side surface thereof. The shafts 31 are rotatable about a line in a direction parallel to the vertical direction. The propellers 32 are coupled to the shafts 31, and the propellers 32 are rotated by a drive source such as a motor that is not shown.

In the present embodiment, the drive source can induce a flow toward the vertical direction by rotating the propeller 32, and in the present embodiment, an upward flow in the vertical direction is induced. When the propeller 32 induces the upward flow in the vertical direction, the flow is dispersed in a horizontal direction near the liquid surface.

Inside the cooling tank 10, plate-shaped members each having a surface parallel to the vertical direction are provided, an uppermost portion of each plate-shaped member is present at a position deeper than the liquid surface, and a lowermost portion of each plate-shaped member is present at a position shallower than the bottom of the cooling tank 10. Further, wide surfaces of the plate-shaped members are disposed so as to face each other. Thus, the flow induced in the quenching coolant W circulates in opposite directions on front and back surfaces of the plate-shaped members. Therefore, when the flow induced by the propellers 32 is dispersed in the horizontal direction near the liquid surface, the flow further flows downward in the vertical direction near the center of the cooling tank 10. Then, when the downward flow in the vertical direction near the center of the cooling tank 10 reaches the vicinity of the bottom surface, the flow flows to the side surface side again and circulates to the side of the propellers 32. As a result, the flow as shown by a broken line arrow in FIG. 1A is formed. That is, in the cooling tank 10, a circulating flow is formed in which the flow flows downward in the vertical direction near the center and flows upward in the vertical direction near the side surface of the cooling tank 10. Here, as long as the circulating flow can be formed, a member other than the plate-shaped member such as an annular member may be disposed.

The drive source for rotating the shafts 31 can change the rotation speed of the shafts 31, and by changing a control signal for the drive source, a flow speed of the circulating flow in the cooling tank 10 can be specified. In the present embodiment, the configuration is such that when the object S to be treated is immersed, the flow speed of a downward flow Fd at a part in contact with a side surface of the object S to be treated can be controlled. That is, the configuration is such that when the flow speed is specified by a control command to the drive source, the flow speed of the downward flow Fd of the quenching coolant W at the part in contact with the side surface of the object S to be treated becomes the specified flow speed.

In the present embodiment, the object S to be treated is a component after a carburizing treatment. It is preferable that the carburizing treatment be carried out by a carburizing treatment device that is not shown in FIG. 1A, and the object S to be treated be heated by a furnace of various modes, and the carbon present around the object S to be treated be carburized in the object S to be treated. Of course, the configuration of the furnace is not limited, and the object S to be treated may be transported while being carburized in the furnace, or the object S to be treated may be taken out after the object S to be treated that is present at a fixed position in the furnace is carburized. The mode of carburizing is not limited, and carburizing may be performed in various modes such as gas carburizing, liquid carburizing, solid carburizing, vacuum carburizing (vacuum gas carburizing), and plasma carburizing. In any case, the object S to be treated after carburizing is performed may be set on the support base 21 and quenching may be performed.

(2) Heat Treatment Process

Next, the heat treatment process (a carburizing treatment and a quenching treatment) for the object S to be treated will be described. FIG. 3 is a flowchart showing the heat treatment process according to the present embodiment. In the heat treatment process, the object S to be treated that is a heat treatment target is set in the carburizing treatment device (step S100). Next, a carburizing treatment is performed (step S105). Conditions of the carburizing treatment are determined based on the purpose of use, etc. of the object S to be treated. For example, a predetermined carbon-containing substance (gas or the like) is introduced into the carburizing treatment device in which the object S to be treated is set, and the object S to be treated is heated to a target temperature at a predetermined temperature rise rate. Then, when the object S to be treated reaches the target temperature, the object S to be treated is maintained at the target temperature for just a predetermined period.

Next, the object S to be treated in which the carburizing treatment has been performed is set in the moving device 20 (step S110). That is, the object S to be treated in which the carburizing treatment has been performed is placed on the support base 21. Next, a flow speed Vq is set to a synchronization speed (step S115). That is, a control signal is output to the drive source that rotates the shaft 31, and the rotation of the propeller 32 is started. At this time, the flow speed of the downward flow Fd of the quenching coolant W at the part in contact with the side surface of the object S to be treated is set to be the synchronization speed. Here, the synchronization speed is a predetermined speed, and the details will be described later.

Next, a descending speed Ve of the object to be treated is set to the synchronization speed (step S120). That is, the control signal is output to the drive source for moving the support base 21, and as a result, the descending speed Ve of the support base 21 becomes the synchronization speed, which is the same value as the flow speed of the downward flow Fd of the quenching coolant W. The synchronization speed is preset as a speed value at which the descending speed Ve for lowering the support base 21 and the flow speed of the downward flow Fd of the quenching coolant W at the part in contact with the side surface of the object S to be treated are synchronized.

That is, in the present embodiment, by utilizing the fact that the descending speed of the support base 21 can be controlled in the moving device 20, and the flow speed of the downward flow Fd of the quenching coolant W at the part in contact with the side surface of the object S to be treated can be controlled by the rotation of the propeller 32, the two speeds are matched. As a result, when the object S to be treated comes into contact with the liquid surface of the quenching coolant W and the immersion is started, a relative speed of the object S to be treated on the inner side of the liquid surface of the quenching coolant W and the quenching coolant W becomes zero.

Specifically, since the object S to be treated is mounted on the support base 21 of the moving device 20, the movable direction of the object S to be treated matches the movable direction of the support base 21. Thus, the moving direction of the object S to be treated is a direction directed vertically downward. In contrast, the direction in which the quenching coolant W flows at the part in contact with the side surface of the object S to be treated is also parallel to the vertical direction in almost the entire height direction and is directed vertically downward. Therefore, the moving direction of the object S to be treated matches the direction of the flow of the quenching coolant W in contact with the object S to be treated.

Further, in the present embodiment, the descending speed Ve of the support base 21 and the flow speed Vq of the downward flow Fd of the quenching coolant W at the part in contact with the side surface of the object S to be treated are both the synchronization speed and are matched. Therefore, the relative speed of the object S to be treated on the inner side of the liquid surface of the coolant and the quenching coolant W is zero. In the present embodiment, this state is referred to as a synchronized state. Although the descending speed Ve may be any speed, the shorter the period from the start of immersion of the object S to be treated in the coolant to the completion of immersion, the smaller the temperature difference resulting from the time difference in which the object S to be treated is in contact with the coolant, and thus, a distortion is less likely to occur. Therefore, the descending speed Ve is preferably as fast as possible, and can be a speed such as 100 min/s to 1500 mm/s.

In the synchronized state as described above, the relative speed of the object S to be treated and the quenching coolant W is zero, and the moving speed of the object S to be treated is the descending speed Ve. Since the descending speed Ve is larger than zero in this state, it can be said that this state is a state in which the relative speed of the object S to be treated and the quenching coolant W is slower than the moving speed (descending speed Ve) of the object to be treated. Since it is difficult to strictly control or measure the direction of the flow speed, there may be an error in the direction and speed of the flow, and the direction and speed of the flow may be a control target amount instead of the measurement result.

When the synchronized state is realized in steps S115 and S120, immersion of the object S to be treated is performed. That is, in the present embodiment, before the immersion of the object S to be treated is started (before the object S to be treated comes into contact with the liquid surface of the quenching coolant W), the flow in which the direction is the same as the moving direction of the object S to be treated and in which the speed is the same as the moving speed of the object S to be treated is formed in the quenching coolant W. Thus, in the present embodiment, a synchronized state is already realized at the stage in which the object S to be treated is in contact with the liquid surface of the quenching coolant W.

Figure 1B:
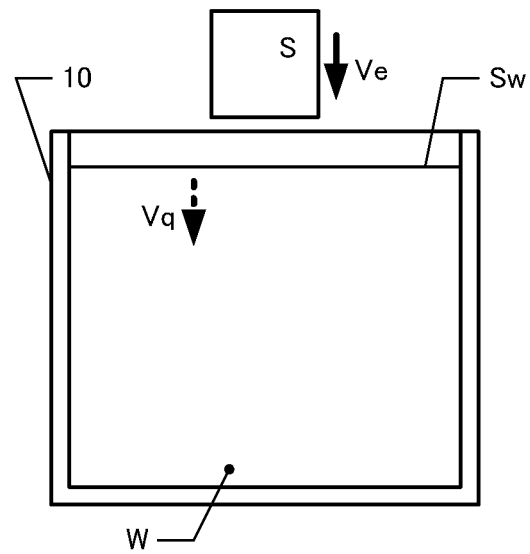
FIGS. 1B to 1D are diagrams schematically showing a quenching process.

FIG. 1B is a diagram schematically showing a state before the object S to be treated is immersed. In FIG. 1B, structures such as the moving device 20 and the shaft 31 are omitted (the same applies to FIGS. 1C to 2B, and the like). When the synchronized state is realized, the object S to be treated gradually approaches the liquid surface of the quenching coolant W, in a state in which the flow speed Vq and the descending speed Ve are synchronized as shown in FIG. 1B.

Figure 1C:
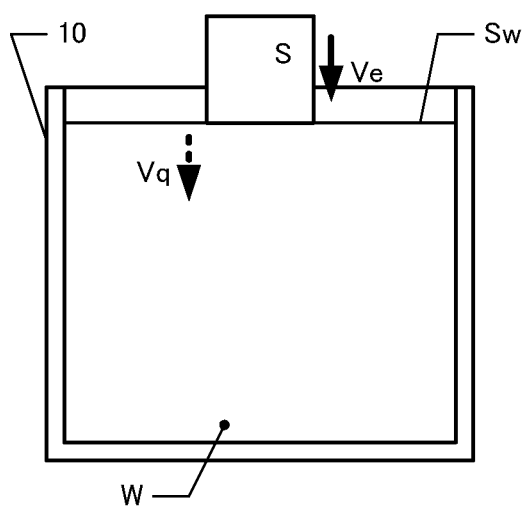
Figure 1D:
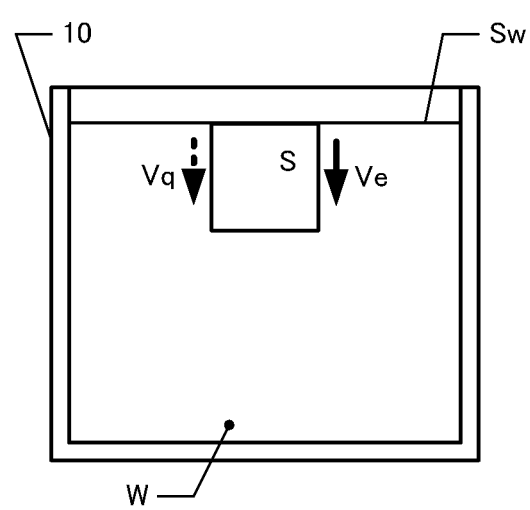

When the object S to be treated descends in the synchronized state and reaches the liquid surface of the quenching coolant W as shown in FIG. 1C, the heat of the object S to be treated of the part in contact with the quenching coolant W is moved to the quenching coolant W so that the object S to be treated is cooled. As shown in FIG. 1C, the state in which the object S to be treated reaches the liquid surface of the quenching coolant W is the state in which the immersion is started. After the immersion is started, the movement by the moving device 20 is continued, and when the vertically upper surface of the object S to be treated eventually reaches the liquid surface of the quenching coolant W as shown in FIG. 1D, the entire object S to be treated is in a state of being immersed in the quenching coolant W. The state in which the entire object S to be treated is immersed in the quenching coolant W is the state in which the immersion is completed.

Figure 2A:
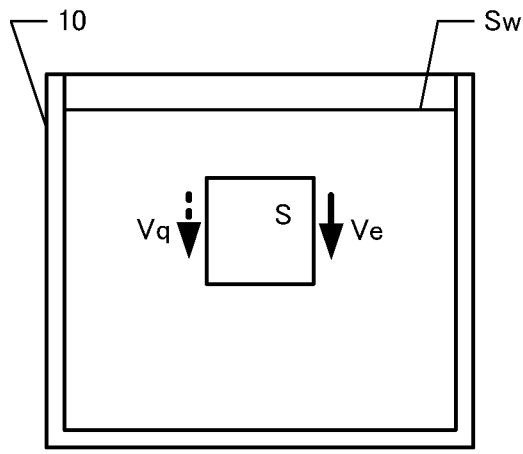
FIGS. 2A and 2B are diagrams schematically showing a quenching process.
Figure 2B:
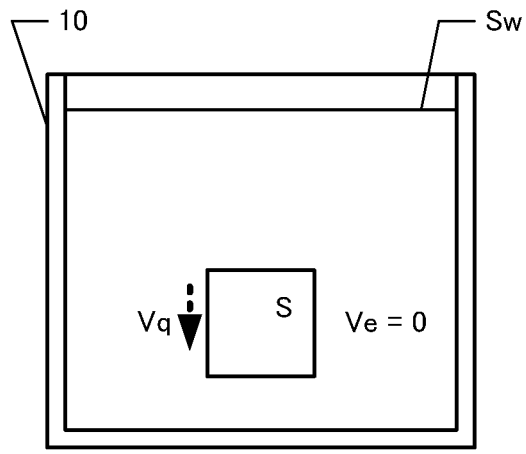

In the present embodiment, the synchronized state is continued even after the immersion is started and the immersion is completed (for example, the state shown in FIG. 2A). In the synchronized state, as shown in FIGS. 1B to 1D, while the object S to be treated descends downward in the vertical direction, a liquid surface Sw of the quenching coolant W does not move in the vertical direction (the rising of the liquid surface by the volume of the object S to be treated is excluded). Thus, in FIG. 1C and the like, the relative speed of the object S to be treated and the liquid surface Sw of the quenching coolant W is not zero. In contrast, after the start of immersion, the quenching coolant W flows downward in the vertical direction on the inner side of the liquid surface Sw. Therefore, after the state shown in FIG. 1C, as long as the state is the synchronized state, the relative speed of the object S to be treated on the inner side of the liquid surface Sw of the quenching coolant W and the quenching coolant W is zero.

In this way, when the movement of the object S to be treated inside the quenching coolant W and the movement of the quenching coolant W in contact with the object S to be treated are synchronized, the quenching coolant W that is in contact with the object S to be treated and to which heat from the object S to be treated is transferred is in a state in which the quenching coolant W moves with the object S to be treated and stays around the object S to be treated. Thus, although rapid cooling of the object S to be treated that is in contact with the quenching coolant W is started by the quenching coolant W, when the synchronized state is maintained, the quenching coolant W in contact with the object S to be treated is gradually warmed and cooling is not promoted.

That is, when the quenching coolant W around the object S to be treated moves to another place by stirring or the like, the quenching coolant W that has become hot around the object S to be treated is replaced by the quenching coolant W that has a low temperature. However, in the synchronized state, the quenching coolant W that is in contact with the object S to be treated and that has become hot is not easily replaced by the low temperature coolant, and cooling is not promoted. When the synchronized state is maintained, a cooling speed of a part that reaches the liquid surface of the quenching coolant W first and that starts cooling first gradually slows down. In contrast, the cooling speed of the part that later reaches the liquid surface of the quenching coolant W and that starts cooling is faster than the cooling speed of the part in which cooling is started first. Thus, when the synchronized state is maintained, the temperature difference that occurs on the surface of the object S to be treated gradually becomes smaller, and the occurrence of distortion in the object S to be treated can be suppressed.

Then, when the surface of the object S to be treated undergoes martensitic transformation in a state in which the temperature difference on the surface of the object S to be treated is suppressed and the occurrence of distortion in the object S to be treated is suppressed, the surface of the object S to be treated becomes hard and the object S to be treated is less likely to be deformed thereafter. Thus, since the synchronized state is maintained, quenching can be completed in a state in which the occurrence of distortion is suppressed. Therefore, in the present embodiment, it is considered that the surface of the object S to be treated has undergone martensitic transformation when a predetermined period has elapsed after the start of immersion.

Thus, when the immersion of the object S to be treated is started in steps S115 and S120, it is determined whether a predetermined period has elapsed since the object S to be treated came into contact with the quenching coolant W (step S125). The predetermined period is a period from when the object S to be treated comes into contact with the quenching coolant W until the surface of the object S to be treated undergoes martensitic transformation, and is predetermined. The predetermined period may be determined by various methods, and in the present embodiment, it is determined as a period until the martensite fraction of the surface of the object S to be treated reaches a predetermined ratio. That is, when the ratio of martensite formed on the surface of the object S to be treated is equal to or greater than a threshold value, it is considered that the surface of the object S to be treated has undergone martensitic transformation.

The martensite fraction may be determined by a degree of distortion allowed in the object S to be treated. For example, it is possible to adopt a configuration in which the period until the martensite fraction of the surface of the object to be treated reaches 28% is set as the predetermined period. According to this configuration, the distortion that occurs in the object S to be treated can be reduced almost to the limit (details will be described later). Here, the martensite fraction $P(t)$ is expressed as follows.

$$P(T)=1-\exp(-b(Ms-T))$$

T: Temperature

Ms: Martensitic transformation start temperature b: A constant specified by the material and the carbon concentration (for example, in SCM420, b=0.143 in a base material and b=0.01 when carburized to a surface carbon concentration of 0.8 (mass %))

In any case, in step S125, whether the surface of the object S to be treated has undergone martensitic transformation is specified based on the predetermined period. When determining whether the predetermined period has elapsed since the object S to be treated has come into contact with the quenching coolant W, the start of the period may be specified by various methods. For example, a sensor (not shown) may detect that the object S to be treated is in contact with the quenching coolant W, or the time it takes for the support base 21 to move from the initial position to the position at which the object S to be treated comes into contact with the quenching coolant W when the support base 21 is lowered from the initial position at the descending speed Ve may be calculated.

In step S125, when it is determined that the predetermined period has elapsed since the object S to be treated comes into contact with the quenching coolant W, the flow speed Vq is set to the rapid cooling speed (step S130), and the descending speed Ve of the object to be treated is set to zero (step S135). That is, in the present embodiment, the synchronized state is maintained for the predetermined period after the object S to be treated comes into contact with the quenching coolant W, and the lowering of the support base 21 in the moving device 20 after the predetermined period is stopped and the synchronized state is stopped (the state shown in FIG. 2B). As a result, the circulation of the quenching coolant W around the object S to be treated is promoted, and the outflow of heat from the object S to be treated to the quenching coolant W is promoted. Thus, cooling is performed at a higher speed.

The rapid cooling speed that is the flow speed Vq set in step S130 may be predetermined as the flow speed when the quenching coolant W promotes exchange of heat after the synchronized state is stopped. To this extent, the rapid cooling speed may be the same as or different from the synchronization speed. When the rapid cooling speed is the same as the synchronization speed, step S130 can be omitted. In step S135, although the descending speed Ve is set to zero in order to stop the synchronized state, of course, other values may be used. For example, when the configuration is such that the support base 21 is raised little by little so that the object S to be treated comes out of the quenching coolant W as the quenching is completed, the period required to raise the object S to be treated after quenching is completed can be shortened.

In any case, when the synchronized state is stopped by steps S130 and S135, the process is put on standby until quenching is completed (step S140). The completion of quenching may be determined by various conditions, and for example, a configuration in which the elapse of the predetermined time is the condition can be adopted.

When it is determined in step S140 that quenching has been ended, the object to be treated is raised (step S150). That is, the moving device 20 is controlled and the support base 21 is raised. As a result, the state in which the object S to be treated is immersed in the quenching coolant W is ended, and the heat treatment process is ended. Of course, this cooling step is an example, and after that, heat treatment such as tempering, annealing, and high frequency heating may be performed.

In the present embodiment, although the descending speed Ve of the support base 21 is constant from before the start of immersion through the completion of immersion to after the completion of quenching, of course, the descending speed Ve and the like may be variable. For example, the configuration may be such that in the period from the start of immersion to the completion of immersion, the descending speed is set to end the period from the start of immersion to the completion of immersion at an early stage, and the descending speed is changed continuously or stepwise after the start of immersion or after the completion of immersion. That is, a configuration may be adopted in which the control from the start of immersion to the completion of immersion and the control after the completion of immersion are controlled separately. That is, as long as a state in which the relative speed of the object S to be treated and the quenching coolant W is slower than the moving speed of the object S to be treated (0<Vq<2Ve) is maintained, the descending speed Ve may be controlled at various speeds.

(3) Embodiment

Next, the characteristics of the object S to be treated when quenching is performed by the above-mentioned heat treatment process will be described. FIG. 4 shows an example in which a columnar shaft (diameter 36 mm, shaft length 148 mm) formed by using the SCM 20 is placed on the support base 21 in a state in which the axial direction is perpendicular to the vertical direction, and quenching is performed. That is, FIG. 4 shows the conditions when the same material is quenched in different quenching steps and the characteristics of the shafts manufactured under each condition.

The coolant in the comparative example is quenching oil, and the comparative example is an example in which quenching with hot oil is performed without realizing a synchronized state. The quenching coolant W in each of the Examples 1 to 4 is quenching oil (hot oil), quenching oil (cold oil), and water. The heat transfer coefficient of the coolant is 3800 W/(m²·K) for hot oil, 7500 W/(m²·K) for cold oil, and 11000 W/(m²·K) for water.

In FIG. 4, for each of the comparative example and the Examples 1 to 4, the quenching temperature (° C.), the descending speed Ve (mm/s) of the object S to be treated, and the flow speed Vq (mm/s) of the quenching coolant W, the temperature (° C.) of the quenching coolant W, and the synchronization time (s) are shown. Here, the quenching temperature is a temperature before the object S to be treated comes into contact with the liquid surface of the quenching coolant W. In the descending speed Ve and the flow speed Vq, the downward vertical direction is the positive direction. The normal temperature at the temperature of the quenching coolant W is 25° C.

The synchronization time is the time from when the object S to be treated comes into contact with the quenching coolant until the descending speed Ve is set to zero. That is, in each of the Examples 1 to 4, although Ve=Vq in the synchronized state, Ve=0 when the synchronization time elapses. Thus, in each of the Examples 1 to 4, the synchronization time has a predetermined period from when the object S to be treated comes into contact with the quenching coolant until the martensitic transformation of the surface of the object S to be treated occurs, and the predetermined period is 280 seconds, 260 seconds, 10 seconds, 3 seconds, respectively.

The comparative example is an example in which the descending speed Ve of the object S to be treated is set to 200 mm/s, and after the object S to be treated is held in the quenching oil at 120° C. for 300 seconds, the object S to be treated is taken out of the quenching oil. In the comparative example, the flow speed Vq=200 mm/s is set to flow in the opposite direction of the movement of the object S in order to increase the cooling speed, and the quenching oil is stirred. Example 1 is an example in which the temperature of the quenching oil is 120° C., the descending speed Ve of the object S to be treated is 200 mm/s, the flow speed Vq of the quenching oil is 200 mm/s, the synchronized state is continued for 280 seconds, and then the synchronized state is ended with the descending speed Ve set to zero and the flow speed Vq set to 200 mm/s. Example 2 is an example in which the temperature of the quenching oil is 80° C., the descending speed Ve of the object S to be treated is 200 mm/s, the flow speed Vq of the quenching oil is 200 mm/s, the synchronized state is continued for 260 seconds, and then the synchronized state is ended with the descending speed Ve set to zero and the flow speed Vq set to 200 mm/s.

Example 3 is an example in which the temperature of the water is the normal temperature, the descending speed Ve of the object S to be treated is 200 mm/s, the flow speed Vq of the water is 200 mm/s, the synchronized state is continued for 10 seconds, and then the synchronized state is ended with the descending speed Ve set to zero and the flow speed Vq set to 200 min/s.

In each embodiment, the object S to be treated is taken out after being held in the quenching coolant W until the temperature difference between the surface and the inside of the object S to be treated is eliminated in the state in which the synchronized state is ended. However, in the examples, since martensite is formed on the surface of the object S to be treated at the stage in which the synchronized state is ended, the period in which the object S to be treated is held in the quenching coolant W while the synchronized state is ended does not significantly affect the distortion amount of the object S to be treated.

In FIG. 4, as the characteristics of the object S to be treated obtained by the above comparative example and the examples, a distortion amount (bending amount) (μm), a surface hardness (Hv), an effective curing depth (mm), and an internal hardness (Hv) are shown. A distortion amount indicates how much the columnar axis of the object S to be treated is bent in the vertical direction, and indicates the distance between an uppermost portion and a lowermost portion of the columnar axis of the object S to be treated in the vertical direction. A surface hardness is an average value of a Vickers hardness of the surface of the object S to be treated. An effective curing depth is an average value of a depth at which the Vickers hardness becomes a default value (513 Hv in the present example). An internal hardness is the Vickers hardness at the center of the object S to be treated.

In the above examples, when the comparative example and the examples are compared, the distortion amount is 3 μm or less and is very small, regardless of the type of the quenching coolant W. In contrast, when the synchronized state is not realized as in the comparative example, a distortion of 7 μm is generated, which is larger than any of the examples. Thus, the distortion amount that occurs in the object S to be treated is suppressed by maintaining the synchronized state from the when the object to be treated comes into contact with the quenching coolant until the surface of the object to be treated undergoes martensitic transformation.

Further, when the quenching coolant W is an oil (for example, the comparative example, the Example 1 and Example 2), and when the quenching coolant W is a coolant having a heat transfer coefficient equal to or higher than that of water (for example, the Examples 3 and 4) are compared, when quenching with the same material, the effective curing depth can be deepened when the quenching coolant W is the coolant with the heat transfer coefficient equal to or higher than that of water than when the quenching coolant W is an oil. Specifically, when the quenching coolant W is water, since the quenching coolant W has a higher heat transfer coefficient than oil, cooling can be performed more efficiently.

After austenite is formed on the shaft by carburizing treatment before quenching, martensite is formed when rapid cooling is performed. The faster the cooling speed of this cooling, the more efficiently martensite can be formed. Thus, it is possible to efficiently perform martensitic transformation when the quenching coolant W is water as compared with the case in which the quenching coolant W is a quenching oil. As a result, compared to when the quenching coolant W is quenching oil, the synchronization time required to obtain the object S to be treated having the same surface hardness as that of the object S to be treated when the quenching coolant W is quenching oil is very short when the quenching coolant W is water.

Further, when water is used as the quenching coolant W, the effective curing depth in the object S to be treated of the same material can be deepened as compared with the case in which the quenching oil is used. FIG. 5 is a diagram showing the hardness in the comparative example and the Example 3, and the horizontal axis shows the distance from the center and the vertical axis shows the Vickers hardness. The center is the columnar axis of the object S to be treated, the distance from the columnar axis to the lowermost portion is indicated by a negative value, and the distance from the columnar axis to the uppermost portion is indicated by a positive value.

As shown in FIG. 5, the Vickers hardness of the comparative example is smaller than that of the Example 3, from the surface of the object S to be treated to the entire area inside. As a result, it can be said that the effective curing depth of the comparative example is shallower than that of the Example 3. As described above, when water is used as the quenching coolant W when quenching the object S to be treated of the same material, it is possible to obtain the object S to be treated that is harder and that has a deeper effective curing depth than when the quenching oil is used.

As described above, since cooling can be performed more efficiently by water than oil, the carburizing treatment time required to obtain the object S to be treated having the same effective curing depth can be shortened. When water is used to obtain an effective curing depth equivalent to that of when using the quenching oil, it is sufficient even if the carbon concentration on the surface of the object S to be treated that is a quenching target is low. Thus, the time required for the carburizing treatment may be shorter than in the case in which the quenching coolant W is the quenching oil. In particular, since the carburizing time is proportional to the square of the carburizing depth, when the effective curing depth is allowed to be equivalent to that of the object S to be treated that is obtained when the quenching coolant W is oil, the time required for the carburizing treatment may be very short. As a result, the time and monetary cost for performing the carburizing treatment can be suppressed.

When the carburizing treatment time is shortened and a component having a low carbon concentration on the surface of the object S to be treated can be used as the object S to be treated, the cost for preparing the component can be suppressed. That is, when the carburized component is prepared in advance as the object S to be treated and is cooled after being heated to the austenitizing temperature, the object S to be treated before quenching becomes a soft material compared to when quenching is performed using a quenching oil in which the carbon concentration needs to be set high in advance. Thus, the processing for obtaining the object S to be treated is easy. Therefore, the processing cost when manufacturing the object S to be treated is suppressed.

The predetermined period that is the duration of the synchronized state may be selected so as to reduce the distortion amount remaining in the object S to be treated after the quenching is ended. That is, when the synchronized state is continued at least until the surface of the object S to be treated undergoes martensitic transformation, the possibility of suppressing the distortion remaining on the object S to be treated after the completion of quenching can be increased. However, the predetermined period for continuing the synchronized state may be controlled according to the allowed distortion amount.

Figure 6:
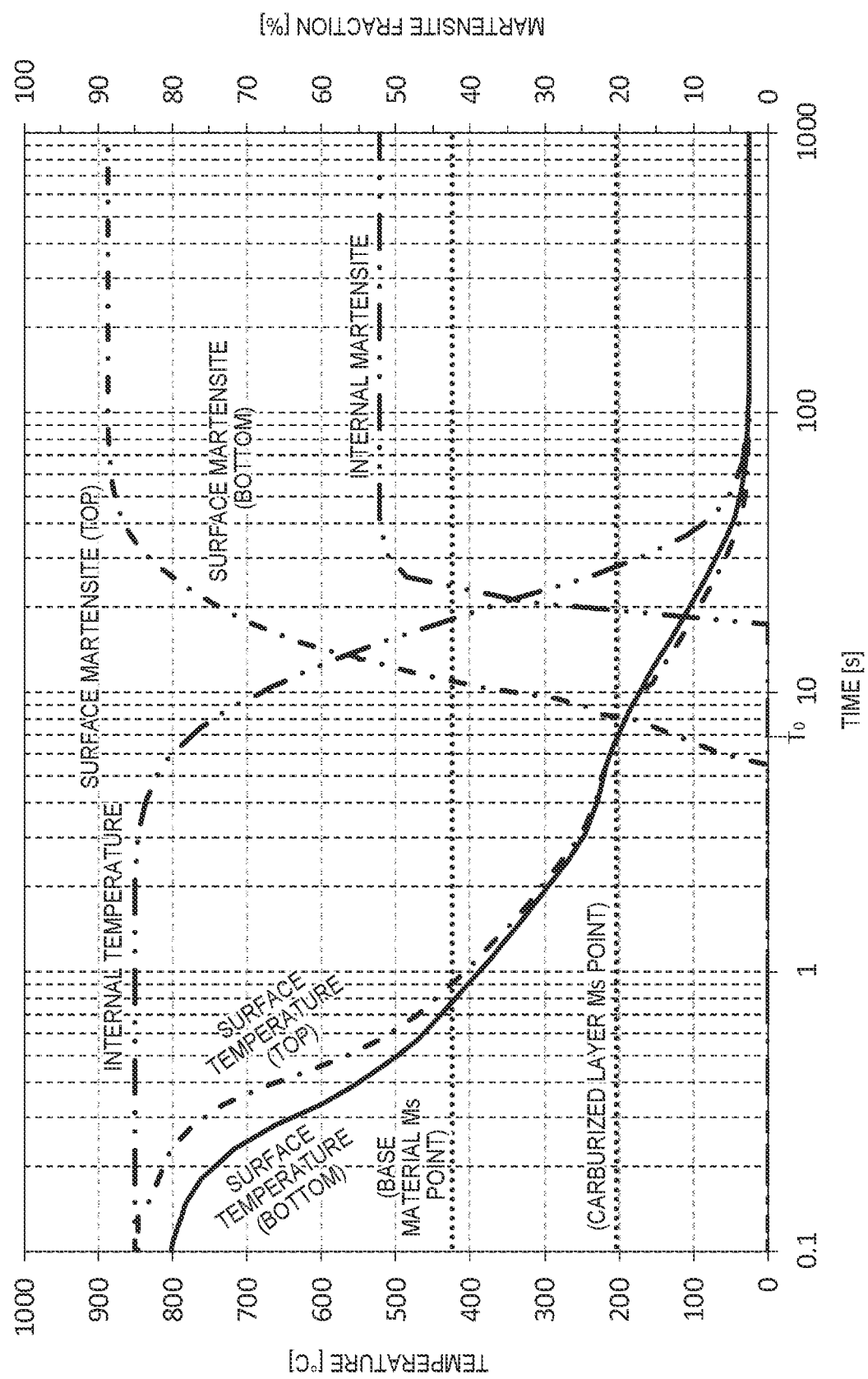
FIG. 6 is a diagram showing a temperature change and a martensite fraction of the object to be treated.

FIG. 6 is a diagram showing a temperature change and a martensite fraction of the object S to be treated, in the Example 3 described above. The horizontal axis indicates time as the logarithm, the left vertical axis indicates the temperature, and the right vertical axis indicates the martensite fraction. In FIG. 6, in this graph, the transition of the temperature and the martensite fraction of the object S to be treated are shown for each elapsed time after the object S to be treated comes into contact with the quenching coolant W.

In FIG. 6, the temperature and the martensite fraction of the surface of the lowermost portion of the object S to be treated are shown by solid lines. Further, the temperature and the martensite fraction of the surface of the uppermost portion of the object S to be treated are shown by a long dashed short dashed line, and the temperature and the martensite fraction inside (at the center) of the object S to be treated are indicated by a long dashed double short dashed line.

When the immersion of the object S to be treated is started, as shown in FIG. 6, a temperature difference is generated between the surface of the lowermost portion and the surface of the uppermost portion of the object S to be treated. In this state, as the object S to be treated is immersed in the quenching coolant W, the object S to be treated is gradually cooled in a state in which there is a temperature difference between the surface of the lowermost portion and the surface of the uppermost portion of the object S to be treated. However, in Example 3, since the synchronized state is formed, the temperature difference between the lowermost portion and the uppermost portion is gradually eliminated, and in the example shown in FIG. 6, the temperature difference is eliminated by the time the temperature of the surface of the object S to be treated reaches the martensitic transformation start temperature (denoted as an Ms point of the carburized layer in FIG. 6). Thus, there is little difference in the state of thermal expansion and the like in the lowermost portion and the uppermost portion of the object S to be treated, and the state is such that distortion is unlikely to occur. In the present embodiment, in this way, the surface of the object S to be treated is equal to or below the martensitic transformation start temperature in a state in which there is no temperature difference between the upper and lower parts of the object S to be treated in the vertical direction.

When the surface of the object S to be treated becomes equal to or below the martensitic transformation start temperature, martensite is formed on the surface of the object S to be treated. That is, as shown in FIG. 6, when the time in the synchronized state elapses for about 5 to 6 seconds, martensite is formed on the surface of the object S to be treated. In addition, the martensite fraction of the surface of the object S to be treated increases with time. When martensite is formed on the surface of the object S to be treated in this way, the surface of the object S to be treated becomes hard, which has an effect of suppressing distortion. Thus, there is no need to continue the synchronized state until the martensite fraction becomes excessively large, and the duration of the synchronized state may be determined so that the martensite fraction is suppressed within a range of the distortion amount required for the object S to be treated.

In FIG. 7, the horizontal axis indicates the duration of the synchronized state, and the vertical axis indicates the distortion amount and the martensite fraction of the surface. In addition, for the same object S to be treated as that of the Example 3, FIG. 7 shows how the distortion amount generated in the object S to be treated is changed when the duration of the synchronized state is changed under the same conditions as those shown in FIG. 4. The distortion amount of the object S to be treated shown in FIG. 7 is the distortion amount in the state in which the object S to be treated is completed after quenching is finished, and is shown by a solid line and a vertical axis on the left in the graph shown in FIG. 7. The martensite fraction of the surface of the object S to be treated shown in FIG. 7 is a value at the stage in which the synchronized state is ended, and is shown by a broken line and a vertical axis on the right side in the graph shown in FIG. 7.

As shown in FIG. 7, as the predetermined period (synchronization time) for continuing the synchronized state is increased, the martensite fraction, which is the ratio of martensite formed on the surface of the object S to be treated, is increased. The distortion amount remaining in the object S to be treated after the quenching is finished decreases as the predetermined period for continuing the synchronized state is increased. However, when the distortion amount decreases to a limit value (1 μm in the example shown in FIG. 7), the distortion amount does not decrease thereafter. In the example shown in FIG. 7, when the duration of the synchronized state exceeds 10 seconds, the change in the distortion amount slows down, and thereafter, there is no significant change even when the duration of the synchronized state is increased. As described above, when the martensite fraction was analyzed at the stage in which the change in the distortion amount became almost constant, it was found that the martensite fraction was 28%. Thus, when the state in which the martensite fraction of the surface of the object to be treated is 28% or more is regarded as the state in which the surface of the object to be treated has undergone martensitic transformation and the configuration is such that the synchronized state is stopped in this state, the distortion of the object S to be treated can be substantially minimized.

In contrast, when the allowable range of the distortion amount in the object S to be treated is larger, the duration of the synchronized state can be further shortened. For example, the duration of the synchronized state that is required in order to set the distortion amount to 1/15 (6.3 μm shown in FIG. 7) with respect to the distortion amount of the state in which the duration of the synchronized state is zero seconds (the conventional quenching indicated in FIG. 7), is T1 shown in FIG. 7. The martensite fraction for this duration is 6.8%. Thus, when it is desired to reduce the distortion generated in the object S to be treated to 1/15 or less when the synchronized state is not performed, the synchronized state may be continued until the martensite fraction becomes 6.8%.

Further, the duration of the synchronized state that is required in order to set the distortion amount to 1/20 (4.7 μm shown in FIG. 7) with respect to the distortion amount of the state in which the duration of the synchronized state is zero seconds, is T2. The martensite fraction for this duration is 14.5%. Thus, when it is desired to reduce the distortion generated in the object S to be treated to 1/20 or less when the synchronized state is not performed, the synchronized state may be continued until the martensite fraction becomes 14.5%.

Further, the duration of the synchronized state that is required in order to set the distortion amount to 1/30 (3.1 μm shown in FIG. 7) with respect to the distortion amount of the state in which the duration of the synchronized state is one second, is T3. The martensite fraction at this duration is 21.5%. Thus, when it is desired to reduce the distortion generated in the object S to be treated to 1/30 or less when the synchronized state is not performed, the synchronized state may be continued until the martensite fraction becomes 21.5%.

(4) Other Embodiments

The above embodiment is an example for carrying out the present disclosure, and other various embodiments can be adopted. For example, the object to be treated is not limited to the shaft, and various components such as gears and building parts may be the object to be treated. Further, as the attitude of the object to be treated at the time of quenching, various attitudes may be adopted. For example, in many shafts, the axial length is longer than the diameter. Thus, in the attitude in which the axis of the shaft is directed perpendicular to the vertical direction as described above, the shaft is placed on the support base 21 in a placement way in which the height of the object to be treated is the lowest. However, in the placement way in which the height of the object to be treated is the highest, for example, when the shaft has the axial length longer than the diameter, the shaft may be placed on the support base 21 with the axial direction parallel to the vertical direction and quenching may be performed.

Quenching is simply required to be a heat treatment that rapidly cools a metal after the metal is heated to a predetermined temperature, and various materials may be assumed as the object to be treated. For example, quenching is not limited to quenching in which steel that has undergone carburizing treatment is rapidly cooled as in the above-described embodiment, and quenching may be such that carbon-containing steel is prepared in advance and then the steel is rapidly cooled after being heated. Further, the object to be treated may be a material in which carbo-nitriding has been performed, or a material in which nitriding has been performed.

Further, the object to be treated is simply required to be a quenching target, and the material is not limited. For example, various steel materials, general rolled steel materials, carbon steel materials, alloy steels, carburizing steels, tool steels, spring steels, bearing steels, hot rolled steel sheets, cold rolled steel sheets, and carbon steel cast steel products may be the object to be treated. Further, steel materials defined in material standards such as JIS, SAE, and DIN, such as JIS S35C, JIS S45C, JIS SCM440, JIS SCM420, JIS SCM415, JIS SCR440, JIS SCR420, MSB20, DEG, AG20, and the like may be the object to be treated. Further, a material obtained by subjecting these materials to a carburizing treatment, a carbo-nitriding treatment, or a nitriding treatment may also be the object to be treated.

The moving device is simply required to be able to immerse the object to be treated inside the quenching coolant accumulated in the cooling tank by moving the object to be treated. The moving device may be realized by various configurations. For example, the moving device may be various devices capable of moving the object to be treated below the liquid surface from the state in which the object to be treated is disposed above the liquid surface of the quenching coolant. The moving direction of the object to be treated may be parallel to the vertical direction or may be different. The moving speed may be variable. However, even in this case, the relative speed of the object to be treated and the quenching coolant is maintained at a speed slower than the moving speed of the object to be treated.

The state in which the relative speed of the object to be treated and the quenching coolant is slower than the moving speed of the object to be treated and the cooling is moderated is simply required to be maintained at least from when the object to be treated is in contact with the quenching coolant until the surface of the object to be treated undergoes martensitic transformation. That is, when the object to be treated comes into contact with the quenching coolant, cooling is started in the part of the object to be treated that comes into contact with the quenching coolant and thus, a difference in the temperature of the surface starts to occur. Therefore, at this stage, it is preferable that the state is such that the cooling is moderated and the distortion can be suppressed.

Further, the state in which cooling is moderated and the distortion can be suppressed is simply required to be maintained until the surface of the object to be treated undergoes martensitic transformation. That is, when the surface undergoes martensitic transformation, the surface of the object to be treated is hardened and thus, the object to be treated is unlikely to be distorted even when it is rapidly cooled thereafter. Therefore, after the surface of the object to be treated has undergone martensitic transformation, it may be further rapidly cooled. For example, the relative speed of the object to be treated and the quenching coolant may be equal to or higher than the moving speed of the object to be treated.

Of course, after the surface of the object to be treated has undergone martensitic transformation, the movement of the object to be treated by the moving device may be stopped. In this case, it is possible to adopt a configuration in which the quenching coolant around the object to be treated is promoted to be replaced by continuing the operation of the flow device for the quenching coolant flow.

The relative speed of the object to be treated and the quenching coolant is simply required to be slower than the moving speed of the object to be treated. Thus, various configurations can be adopted in addition to the configuration in which the operation of the flow device is controlled so that the relative speed of the object to be treated and the quenching coolant becomes zero as in the above-described embodiment. That is, in the process in which the object to be treated is moved by the moving device, the quenching coolant is simply required to be moved in a speed vector having a component in the same direction as the object to be treated.

The state in which the surface undergoes martensitic transformation is simply required to be a state in which the object to be treated is less likely to be distorted by the martensite. Such a state may be defined by various methods, for example, it may be defined by the elapsed time after the start of carburizing, it may be defined by the temperature of the object to be treated, or it may be defined by the martensite fraction of the surface. That is, although the state in which the object to be treated becomes hard due to martensitic transformation and is not easily affected by distortion may vary depending on the composition of the object to be treated, etc., if the elapsed time, temperature, and martensite fraction are specified in advance for each object to be treated, it can be considered that the surface has undergone martensitic transformation by maintaining the state in which the cooling is moderated until that state is reached.

The immersion is simply required to be a treatment in which the object to be treated is immersed in a coolant. That is, quenching is simply required to be performed so that the heat of the object to be treated is transferred to the coolant by changing from the state in which the coolant is not present around the object to be treated to the state in which the object to be treated is immersed in the coolant. As described above, the immersion is not limited to the treatment in which the object to be treated is immersed in the coolant accumulated in the cooling tank. For example, the configuration may be such that the object to be treated is immersed by making a coolant flow into an empty cooling tank in which the object to be treated is disposed.

That is, the configuration may be such that in the state in which the object to be treated is disposed inside the cooling tank provided with the flow device that makes the accumulated quenching coolant flow, the accumulation of the quenching coolant is started with respect to the cooling tank, the quenching coolant is not made to flow by the flow device at least until the surface of the object to be treated has undergone martensitic transformation after the object to be treated comes into contact with the quenching coolant, and the quenching coolant is made to flow by the flow device after the surface of the object to be treated undergoes martensitic transformation.

Figure 8A:
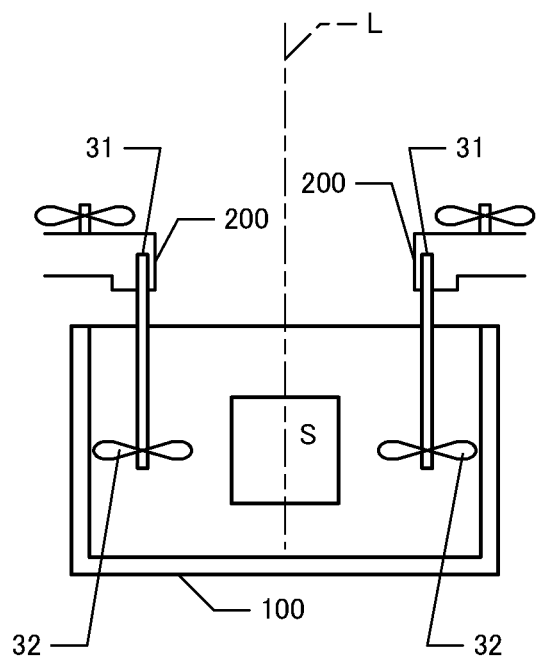
FIG. 8A is a diagram schematically showing the device for carrying out the quenching method.

FIG. 8A is a diagram showing an example of a device that realizes such a configuration. The device shown in FIG. 8A includes a cooling tank 100 formed by opening a surface of a hollow rectangular parallelepiped. In the present embodiment, the quenching coolant W is not accumulated in the cooling tank 100 in advance, and the cooling tank 100 is empty at the initial stage. The object S to be treated is supported inside the cooling tank 100 in an empty state by a support portion (not shown). Although the cooling tank 100 is empty in the present embodiment, the quenching coolant W may be accumulated in the cooling tank 100 at the initial stage as long as it is not in contact with the object S to be treated.

Also in the present embodiment, the flow device 30 (the shaft 31 and the propeller 32) for controlling the flow speed of the quenching coolant W after the quenching coolant W flows into the cooling tank 100 is provided. The configuration for this purpose is the same as the configuration shown in FIG. 1A, and the cooling tank 100 is provided with the shaft 31 extending along the side surface near the side surface thereof. The propellers 32 are coupled to the shafts 31, and the propellers 32 are rotated by a drive source such as a motor that is not shown. Of course, a plate-shaped member may be provided in the cooling tank 100 in the same manner as in the configuration shown in FIG. 1A.

After the quenching coolant W flows into the cooling tank 100, the drive source can induce a flow toward the vertical direction by rotating the propeller 32, and in the present embodiment, an upward flow in the vertical direction is induced. Since the shaft 31 and the propeller 32 are present at positions symmetrical with respect to a line L extending vertically through the center of the cooling tank 100, when the propeller 32 induces a flow upward in the vertical direction, the flow is dispersed in the horizontal direction near the liquid surface and flows downward in the vertical direction near the center of the cooling tank 100. As a result, a circulating flow similar to that shown in FIG. 1A is formed. The drive source for rotating the shafts 31 can change the rotation speed of the shafts 31, and by changing a control signal for the drive source, a flow speed of the circulating flow in the cooling tank 100 can be specified.

In the present embodiment, an inflow passage 200 for making the quenching coolant W flow into the cooling tank 100 is provided. The inflow passage 200 is connected to a tank of the quenching coolant W (not shown), and includes a pump and a valve for adjusting the amount of the quenching coolant W passing through the inflow passage 200. Further, one end of the inflow passage 200 is directed to an opening portion of the cooling tank 100, and when the valve is opened, the quenching coolant W flows inside the cooling tank 100 from the one end.

Thus, when the quenching coolant W is made to flow into the cooling tank 100 from the inflow passage 200 and the quenching coolant W is made to flow in to the height of a water level higher than the uppermost portion of the object S to be treated, the object S to be treated can be immersed. The valve provided in the inflow passage 200 in the present embodiment can adjust the flow amount of the quenching coolant W. Therefore, by adjusting the flow amount of the quenching coolant W with the inflow passage 200, the rising speed of the liquid surface from the start of immersion to the completion of immersion of the object S to be treated that is supported inside the cooling tank 100 can be adjusted.

In this configuration, quenching can be performed by modifying a part of the heat treatment process shown in FIG. 3. Specifically, quenching can be performed by executing the heat treatment process shown in FIG. 9A. In FIG. 9A, the same steps as in FIG. 3 are indicated by the same reference numerals as those in FIG. 3. Also in the heat treatment process shown in FIG. 9A, the carburizing treatment is performed in steps S100 to S105. Thereafter, the object to be treated is set inside the cooling tank 100 (step S200), and the inflow of the quenching coolant W through the inflow passage 200 is started (step S205). At this time, the flow amount of the quenching coolant W is specified in advance so that the rising speed of the liquid surface becomes a predetermined value, and the quenching coolant W flows in at this flow amount.

Figure 8B:
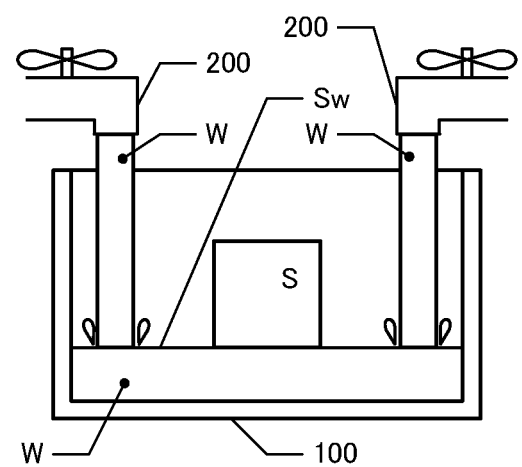
FIGS. 8B to 8D are diagrams schematically showing the quenching process.
Figure 8C:
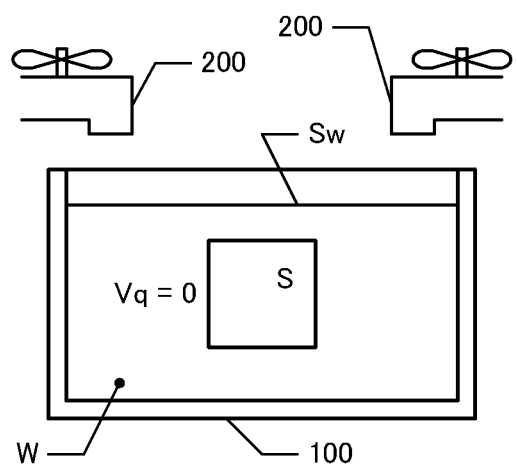

When the inflow of the quenching coolant W is started, the quenching coolant W is gradually accumulated in the cooling tank 100, and as shown in FIG. 8B, the quenching coolant W reaches the lowermost portion of the object S to be treated. This state is the start of immersion of the object S to be treated. When the inflow of the quenching coolant W continues, the quenching coolant W eventually reaches the uppermost portion of the object S to be treated. This state is the completion of immersion. In the present embodiment, the inflow of the quenching coolant W is continued even after this, and the inflow of the quenching coolant W is stopped when the water level of the quenching coolant W reaches a predetermined height. FIG. 8C is a diagram showing a state in which the inflow of the quenching coolant W is stopped.

In the present embodiment, step S115 shown in FIG. 3 is not performed when the quenching coolant W flows in, and the propeller 32 does not rotate after the start of immersion. Thus, the flow in the vertical direction is not induced in the quenching coolant W. In contrast, the object S to be treated is supported inside the cooling tank 100 and does not move in the vertical direction at least at this stage. Thus, also in the present embodiment, as shown in FIG. 8C, the relative speed of the object S to be treated and the quenching coolant W inside (below) the liquid surface Sw of the quenching coolant W is zero. In this state, it can be said that the state is such that the relative speed of the object S to be treated and the quenching coolant W is slower than the moving speed of the object S to be treated. Therefore, when the quenching coolant W is introduced into the cooling tank 100, the quenching coolant W is accumulated in the synchronized state, and the synchronized state is realized even after the immersion is completed.

Figure 8D:
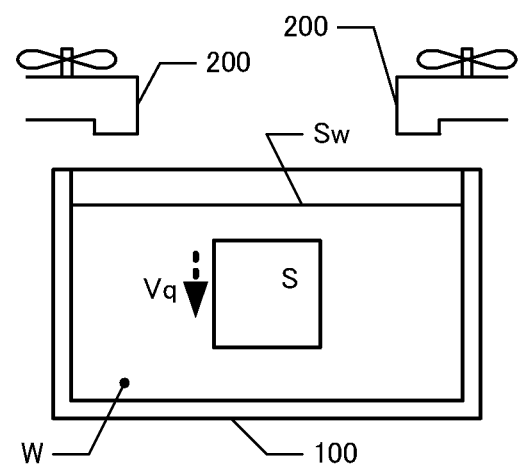

When step S125 is executed in the synchronized state and it is determined that the predetermined period has elapsed, step S130 is executed and the quenching coolant W in the cooling tank 100 is stirred as shown in FIG. 8D. After that, when it is determined in step S140 that the quenching is finished, the step of taking out the object S to be treated (step S210) is performed. This step may be a step of transporting the object S to be treated to the outside of the cooling tank 100, or may be a configuration in which the quenching coolant W is discharged from the cooling tank 100 (for example, by using a discharge port that is not shown), for example.

According to the above configuration, quenching can be performed without providing a device that raises and lowers the object S to be treated with a mechanism capable of adjusting the descending speed. Also in the present example, the predetermined period is simply required to be a period that is from when the object S to be treated comes into contact with the quenching coolant W until the surface of the object S to be treated undergoes martensitic transformation, and that is predetermined. For example, it is possible to adopt a configuration in which the period until the martensite fraction of the surface of the object S to be treated reaches a predetermined ratio is predetermined as a predetermined period.

In the present embodiment, the state in which the quenching coolant W flows in and the liquid surface intersects with the object S to be treated can be regarded as an immersion process, and when the liquid surface reaches above the object S to be treated, it can be considered that quenching is performed in the synchronized state. Thus, the quenching in the present example is also the quenching having the same principle as in the Examples 1 to 4 described above. For example, when the flow amount of the quenching coolant W is adjusted so that the rising speed of the liquid surface is 200 mm/s, immersion is performed at the speed similar to that of the Examples 1 to 3 in which the descending speed of the object S to be treated by the moving device 20 is 200 mm/s, and cooling is performed in the synchronized state. Thus, if the predetermined period after the object S to be treated comes into contact with the liquid surface is a period similar to that of in Examples 1 to 3, the quenching that is qualitatively the same as in these Examples can be carried out.

Therefore, it is possible to suppress the occurrence of distortion in the object S to be treated. Further, it is possible to easily realize the heat treatment process of maintaining the synchronized state at least until the surface of the object S to be treated undergoes martensitic transformation. Further, after the surface of the object S to be treated has undergone martensitic transformation, the quenching coolant is made to flow by the flow device and thus, quenching can be completed at an early stage while suppressing the occurrence of distortion.

Further, various steps may be added to the heat treatment process. For example, auxiliary cooling may be performed for the purpose of suppressing in advance, the temperature difference between the upper and lower portions of the object S to be treated before the immersion or the quenching. Auxiliary cooling may be performed by various methods. For example, it is possible to adopt a configuration in which auxiliary cooling is performed by applying an auxiliary coolant, which is a coolant for auxiliary cooling discharged from a plurality of nozzles, to the object S to be treated. In this case, after stopping the auxiliary cooling of the object to be treated before the surface of the object S to be treated reaches the martensitic transformation start temperature, the object to be treated is cooled to the martensitic transformation start temperature or lower by the quenching coolant.

Figure 2C:
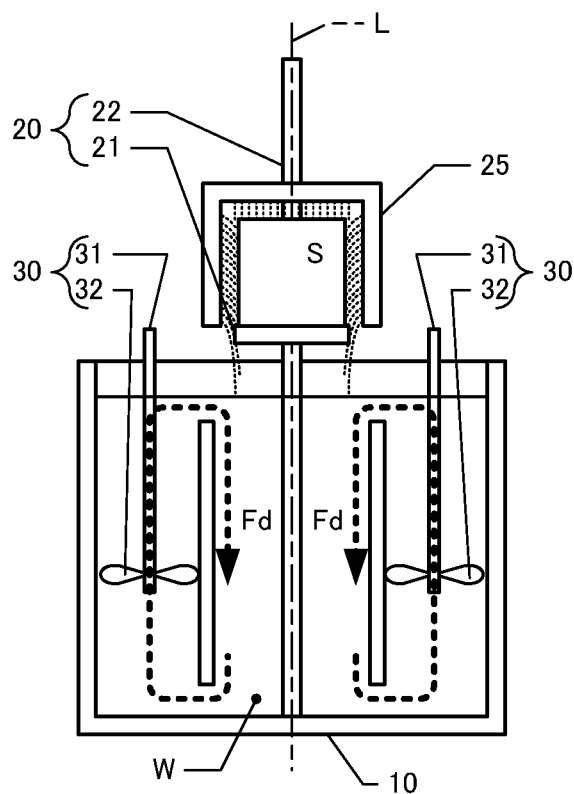
FIGS. 2C and 2D are diagrams showing an example of a device for carrying out the quenching method.

Such a configuration can be realized by the device shown in FIG. 2C, for example. The device shown in FIG. 2C can be realized by adding a shower 25 to the device shown in FIG. 1A. That is, the configuration in FIG. 2C shown by the same reference numerals as in FIG. 1A is the same as the configuration in FIG. 1A. The shower 25 includes a plurality of nozzles, and piping that is not shown are connected. The piping is connected to a tank and pump (not shown) in which the auxiliary coolant that is a coolant for auxiliary cooling is accumulated, and by opening and closing a pressure control valve connected to the piping, the auxiliary coolant can be discharged from each nozzle or the discharge can be stopped. In FIG. 2C, the auxiliary coolant discharged from the nozzle is shown by the broken line around the object S to be treated. The auxiliary coolant is simply required to be a substance that can exchange heat with the object to be treated. However, a configuration may be adopted in which the auxiliary coolant and the quenching coolant W are the same, such as both being water or both being a quenching oil.

In the present embodiment, the auxiliary coolant discharged from each nozzle is applied to a plurality of surfaces of the object S to be treated. In the example shown in FIG. 2C, it is schematically shown that the auxiliary coolant is applied to an upper surface and the side surface of the object S to be treated. However, the auxiliary coolant may be applied to a lower surface of the object S to be treated, of course. In this case, it is possible to adopt a configuration in which the support base 21 is provided with a nozzle and the auxiliary coolant discharged from the nozzle is applied to the object S to be treated, for example.

The part to which the auxiliary coolant discharged from the nozzle of the shower 25 is applied is not limited to the part shown in FIG. 2C. However, when the object S to be treated is immersed in the quenching coolant W without auxiliary cooling being performed by the shower 25, the temperature difference is generated along the moving direction of the object S to be treated (that is, the up-down (vertical) direction shown in FIG. 2C) on the surface of the object S to be treated. Thus, it is preferable that the auxiliary coolant discharged from the nozzle of the shower 25 is applied so as to reach at least a range extending from the uppermost portion to the lowermost portion of the object to be treated in the vertical direction.

In the example shown in FIG. 2C, it is preferable that the auxiliary coolant discharged from the shower 25 is applied to the entire side surface extending from the uppermost portion to the lowermost portion of the object S to be treated. According to this configuration, auxiliary cooling can be performed on the entire side surface extending from the uppermost portion to the lowermost portion of the object S to be treated at the same time. Thus, at the stage in which the object S to be treated comes into contact with the liquid surface of the quenching coolant W by being moved by the moving device 20, the temperature difference generated in the lowermost portion that is the contacted part and the uppermost portion of the object S to be treated that is the farthest from the lowermost portion is moderated. Therefore, it is possible to suppress the occurrence of distortion resulting from the temperature difference generated on the surface of the object S to be treated by immersion.

According to such a device, quenching can be performed in a step of adding a shower starting step to the heat treatment process shown in FIG. 3. For example, in the heat treatment process shown in FIG. 3, a shower starting step may be added between steps S110 and S115. That is, the auxiliary coolant is started to be discharged from the nozzle of the shower 25 between step S110 and step S115.

As a result, as shown in FIG. 2C, the auxiliary coolant is discharged from the nozzle of the shower 25, and auxiliary cooling is performed on the entire side surface extending from the uppermost portion to the lowermost portion of the object S to be treated. Therefore, there is almost no temperature difference between the uppermost portion and the lowermost portion on the surface of the object S to be treated, and the temperature of the object S to be treated can be lowered while maintaining the state in which the temperature difference between the uppermost portion and the lowermost portion, before immersion in the quenching coolant W is started.

In the present embodiment, the auxiliary coolant discharged from the shower 25 drops after being applied to the object S to be treated and is accumulated in the cooling tank 10. In the present embodiment, the auxiliary coolant is the same as the quenching coolant W accumulated in the cooling tank 10. Thus, a configuration for suppressing mixture of the auxiliary coolant discharged from the shower 25 and the quenching coolant W is unnecessary. According to the above configuration, at the timing of the start of immersion, auxiliary cooling is performed on the object S to be treated by the auxiliary coolant discharged from the shower 25. Thus, the temperature difference between the uppermost portion and the lowermost portion of the side surface of the object S to be treated is reduced as compared with the configuration in which the immersion is started without the auxiliary cooling. Therefore, the temperature difference that occurs on the surface of the object S to be treated at the start of immersion can be reduced as compared with the case in which the auxiliary cooling is not performed.

Figure 2D:
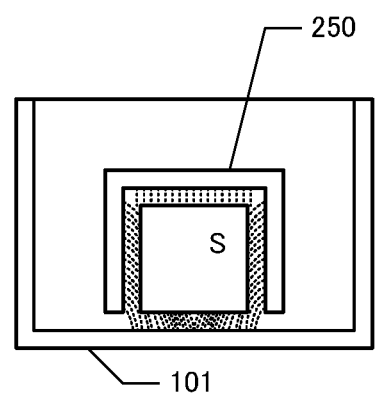

Of course, the configuration for performing auxiliary cooling as described above is not limited to the configuration shown in FIG. 2C in which immersion is performed by lowering the object S to be treated with the moving device 20, and may be applied to the configuration in which immersion is performed by accumulating the coolant in the cooling tank. FIG. 2D shows a configuration in which a shower 250 similar to the shower 25 shown in FIG. 2C is provided inside the empty cooling tank 101. The configuration may be such that auxiliary cooling is performed by discharging the auxiliary coolant with the shower 250, and immersion is performed by accumulating the auxiliary coolant in the cooling tank 101. In this case, when the immersion is completed, the shower 250 is stopped and the synchronized state is established. When the surface of the object S to be treated has undergone martensitic transformation, the synchronized state is stopped. The configuration for stopping the synchronized state may be various configurations. For example, a flow device 30 similar to that shown in FIG. 2C may be provided, or the configuration may be such that the coolant around the object S to be treated is substantially stirred by having the auxiliary coolant discharged from the shower 250.

When the auxiliary cooling for suppressing the temperature difference on the surface of the object S to be treated as described above is performed, the distortion generated in the object S to be treated can be further suppressed as compared with the case in which the auxiliary cooling is not performed. FIG. 9C indicates the distortion amount of a sample in which the sample is immersed in the coolant by the device shown in FIG. 2C in a state in which the axial direction of the similar shaft as in Examples 1 to 4 shown in FIG. 4 is directed perpendicular with respect to the vertical direction and the sample is held until the quenching is completed without operating the flow device 30. Sample A is an example in which the immersion is performed without performing auxiliary cooling with the shower 25, and Sample B is an example in which immersion is performed after performing auxiliary cooling with the shower 25.

Also in Sample A and Sample B shown in FIG. 9C, the coolant is water and the heat transfer coefficient is 11000 W/(m$^2$·K). In FIG. 9C, for Sample A and Sample B, the quenching temperature (° C.), the descending speed Ve (mm/s) of the object S to be treated, the temperature (° C.) of the quenching coolant W, and the shower time (seconds) are shown. Here, the quenching temperature is a temperature before the object S to be treated comes into contact with the liquid surface of the quenching coolant W. The normal temperature at the temperature of the quenching coolant W is 25° C. The shower time is the time from when the auxiliary cooling by the shower 25 is started until the lowermost portion of the object S to be treated comes into contact with the liquid surface Sw of the coolant W.

In both Sample A and Sample B, the distortion generated in the object S to be treated at the stage in which the immersion is completed (the state in which the object S to be treated reaches below the liquid surface of the quenching coolant W) is defined as the post-immersion distortion, and the distortion generated in the object S to be treated at the state in which the quenching is completed is defined as the post-quenching distortion amount. The distortion amount (μm) shown in FIG. 9C indicates the distortion generated in the shaft that is the object S to be treated after the quenching is completed. Here too, the distortion amount indicates how much the columnar axis of the object S to be treated is bent in the vertical direction, and indicates the distance between the uppermost portion and the lowermost portion of the columnar axis of the object S to be treated in the vertical direction. Thus, the distortion amount shown in FIG. 9C indicates the maximum value of the distortion generated in the object S to be treated.

When comparing Sample A and Sample B, the post-immersion distortion amount is 22 μm for Sample A and 1 μm for Sample B. The post-quenching distortion amount is 94 μm for Sample A and 0.7 μm for Sample B. Thus, when the auxiliary cooling is performed, there is an effect of suppressing the distortion amount as compared with the case in which the auxiliary cooling is not performed. Therefore, in the above-described embodiment, when the auxiliary cooling is performed by the shower 25 before the immersion is performed, the distortion amount generated in the object S to be treated can be suppressed.

Further, pre-cooling may be performed for the purpose of suppressing beforehand, the temperature difference between the surface and the inside of the object S to be treated before immersion or quenching. Pre-cooling may be performed by various devices, and the configuration may be such that the object to be treated is pre-cooled by a gaseous pre-coolant before the object to be treated is cooled by the quenching coolant. The configuration in which the gaseous pre-coolant is sprayed onto the object S to be treated may have various configurations, such as a configuration in which the shower 25 is replaced with a gas ejecting device that ejects the pre-coolant in a gaseous state, in the configuration similar to that shown in FIG. 2C. In the present embodiment, since the gaseous pre-coolant does not liquefy even when it exchanges heat with the object S to be treated, even when the quenching coolant W is water or oil, the pre-coolant is not mixed with the quenching coolant W.

Pre-cooling with such a gaseous pre-coolant has a much slower cooling speed than cooling with a liquid pre-coolant. Thus, pre-cooling can be performed without causing a large temperature difference between the surface and the inside of the object S to be treated. Therefore, it is possible to suppress the elongation of the object S to be treated due to the temperature difference between the surface and the inside of the object S to be treated.

Figure 10:
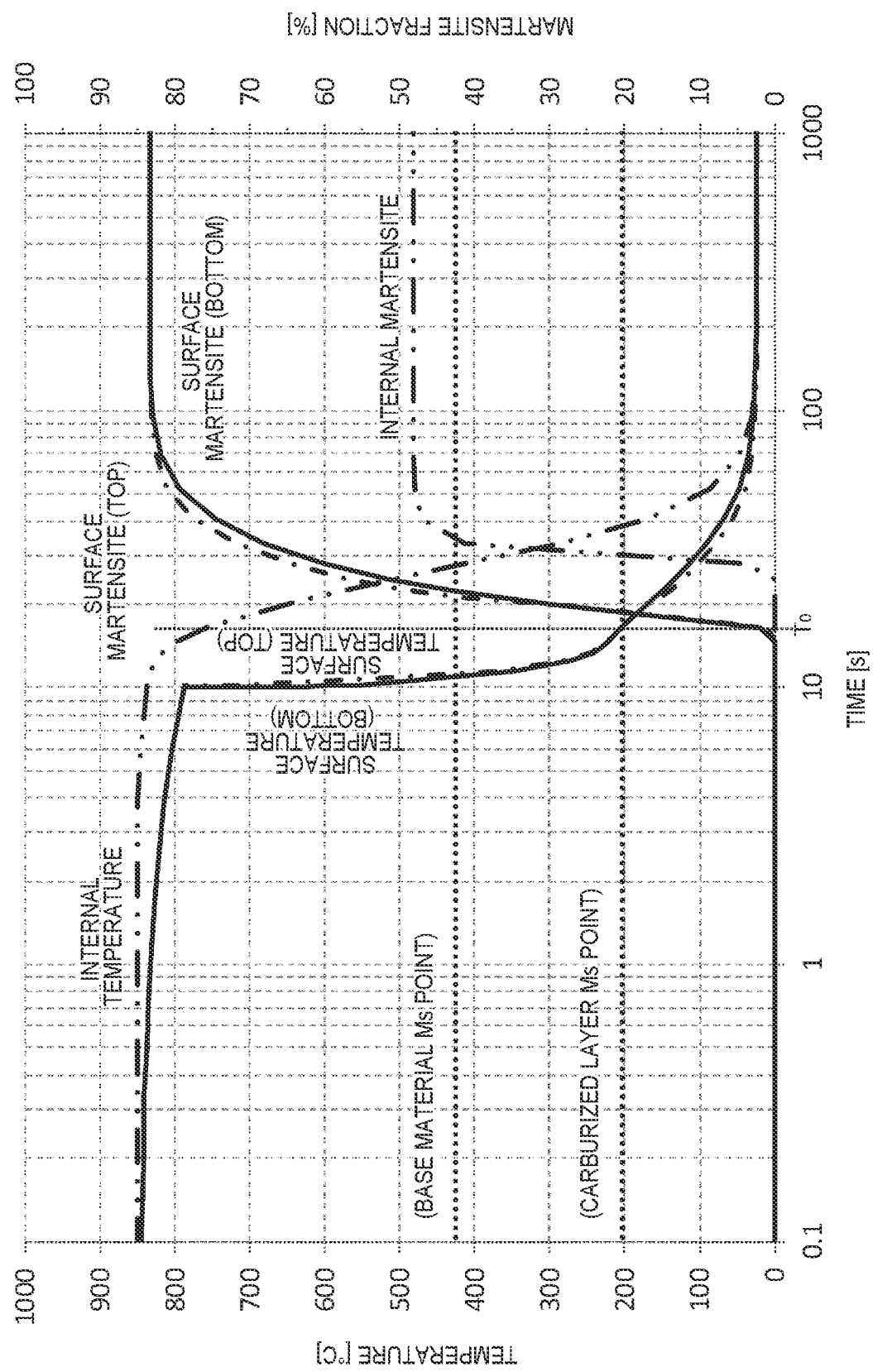
FIG. 10 is a diagram showing a temperature change and a martensite fraction of the object to be treated when pre-cooling is performed.

FIG. 10 is a diagram similar to FIG. 6, and is a diagram showing the temperature change and the martensite fraction when pre-cooling is performed with an $N_2$ gas on the object S to be treated with the same material and temperature as in Example 3 described above. Here too, the horizontal axis indicates time as the logarithm, the left vertical axis indicates the temperature, and the right vertical axis indicates the martensite fraction.

In FIG. 10, the temperature and the martensite fraction of the surface of the lowermost portion of the object S to be treated are shown by solid lines. Further, the temperature and the martensite fraction of the surface of the uppermost portion of the object S to be treated are shown by a long dashed short dashed line, and the temperature and the martensite fraction inside (at the center) of the object S to be treated are indicated by a long dashed double short dashed line.

FIG. 10 shows an example in which pre-cooling is performed on the object S to be treated at 850° C. with $N_2$ gas for about 10 seconds. However, in this pre-cooling, no temperature difference occurs on the surface of the object S to be treated. In contrast, although a temperature difference occurs between the surface and the inside of the object S to be treated, the difference is about 50° C., which is extremely small.

In the present example, in this state, the synchronized state is realized, immersion is started, martensite is formed on the surface when the surface of the object S to be treated becomes below the martensitic transformation start temperature, and quenching is performed. In the example shown in FIG. 10, since the martensite fraction is 28% at the time point at which the object S to be treated is in contact with the liquid surface of the quenching coolant W and about 10 seconds have further elapsed (the time point of 20 seconds on the horizontal axis) from the time when carburizing is started (the time point of 10 seconds on the horizontal axis), if the synchronized state is stopped at this point, the distortion can be suppressed to the limit.

Further, in the present embodiment, since the pre-cooling is performed, the internal temperature of the object S to be treated at the stage in which martensite starts to be formed on the surface of the object S to be treated is lower than in the case in which the pre-cooling is not performed. For example, in the embodiment shown in FIG. 6, the internal temperature of the object S to be treated is 750° C. or higher at the stage in which martensite starts to be formed on the surface of the object S to be treated (time $T_0$ shown in FIG. 6).

In contrast, in the present example, since the object S to be treated is pre-cooled with $N_2$ gas, the inside of the object S to be treated is also cooled to some extent before the immersion is started. Thus, the internal temperature of the object S to be treated is about 740° C. at the stage in which martensite starts to be formed on the surface of the object S to be treated (time $T_0$ shown in FIG. 10). As described above, when the example shown in FIG. 6 and the present example shown in FIG. 10 are compared, in the present example, the internal temperature of the object S to be treated at the stage in which martensite starts to be formed on the surface of the object S to be treated is lower. Thus, in the present example, the degree of thermal expansion inside the object S to be treated is smaller than that of the example shown in FIG. 6. As a result, the elongation occurring in the object S to be treated after quenching is suppressed.

As the quenching coolant, various coolants can be selected as long as the object to be treated can be cooled and hardened by transferring the heat of the object to be treated to the quenching coolant side. The auxiliary coolant is simply required to cool the object to be treated by transferring the heat of the object to be treated to the coolant side and cool the object to be treated until the surface of the object to be treated reaches the martensitic transformation start temperature, and various coolants can be selected.

The quenching coolant and the auxiliary coolant is simply required to be a substance that can perform cooling to achieve the respective purposes of quenching and auxiliary cooling, and are not limited to water.

The auxiliary coolant and the quenching coolant are preferably substances of the same type. Examples of such a configuration include a configuration in which both are coolants containing water as a main component or both are quenching oils. According to this configuration, it is not necessary to provide a cleaning step of the object to be treated between the auxiliary cooling and the quenching, and the auxiliary cooling and the quenching can be continuously executed. Further, it is not necessary to provide a configuration for separating the auxiliary coolant and the quenching coolant, and quenching can be realized by a simple device.

When the quenching coolant is a coolant containing water as a main component, the heat transfer coefficient is higher and the cooling speed is higher compared to the quenching oil. Thus, it is known that when performing quenching with the quenching oil, distortion generated in the object to be treated is decreased as compared with the case in which the quenching is performed with a cooling material of a coolant containing water as a main component.

However, oil having a low heat transfer coefficient has a slower cooling speed than water (a coolant containing water as a main component) having a high heat transfer coefficient and thus, the degree of the quenching is decreased. That is, when the cooling speed is slow, the hardness is lower than when the cooling speed is high, and the depth from the surface of the cured portion (effective curing depth, etc.) becomes shallow. Thus, when water or a coolant containing water as a main component is used as the quenching coolant, since the object to be treated can be cooled at high speed, the surface hardness is higher than when cooled with oil, and the depth from the surface of the hardened portion is also deepened. Therefore, by performing the quenching in the synchronized state while using water or a coolant containing water as a main component as the quenching coolant, it is possible to suppress distortion and secure surface hardness at the same time.

The device described above as a device for realizing the synchronized state is an example, and other devices having various configurations may be adopted. For example, the plate-shaped member in the cooling tank 10 may be omitted, or may have another shape. Further, in the configuration in which the coolant flows into the cooling tank, the configuration may be such that the quenching coolant W is accumulated in the tank 103 in advance as shown in FIG. 9B, and the flow passage from the discharge port of the tank 103 is directed to the cooling tank 102 and the coolant flows into the cooling tank 102 by opening the valve of the discharge port, for example. Of course, in the configuration shown in FIGS. 9B and 8A, the inflow passages for making the coolant flow into the cooling tank may be provided in various portions. For example, a configuration in which the coolant flows into the cooling tank by a pump from an inflow passage that opens on the lower surface of the cooling tank may be adopted.

The predetermined period after the object to be treated comes into contact with the quenching coolant may be a period during which the synchronized state is maintained after the start of immersion. The predetermined period may be set so that the object to be treated does not remain distorted or the object to be treated does not crack even if the rapid cooling is promoted by releasing the synchronized state after the elapse of the predetermined period. That is, even in a configuration in which the rapid cooling is performed with the quenching coolant, excessive rapid cooling can be suppressed by maintaining the synchronized state for the predetermined period, and the predetermined period may be set so that rapid cooling is performed at an even higher speed by the synchronized state being released when the predetermined period has elapsed.

Although the predetermined period is the period during which the synchronized state is maintained, since the state of the object to be treated does not change abruptly after the elapse of the period required to maintain the synchronized state, there may be an allowance in the predetermined period to a certain extent. However, when the synchronized state is stopped at an excessively early stage and rapid cooling is started, the distortion generated in the object to be treated may remain or the object to be treated may be cracked. In this sense, the predetermined period may be defined as the minimum period during which the synchronized state should be maintained. Thus, when there is no problem when the synchronized state is continued after the end of the predetermined period, the synchronized state may be continued even after the predetermined period has elapsed.

The relative speed of the object to be treated and the quenching coolant inside the liquid surface of the quenching coolant is not limited to zero, and may be various relative speeds as long as it is possible to prevent an excessive temperature difference from being formed in the object to be treated, by moderating the rapid cooling by the quenching coolant. The relative speed of the object to be treated and the quenching coolant may be defined by paying attention only to a specific direction. For example, in the above-described embodiment, only the relative speed in the direction parallel to the vertical direction, which is the moving direction of the object to be treated or the moving direction of the liquid surface, may be considered.

DESCRIPTION OF THE REFERENCE NUMERALS

10 . . . Cooling tank, 20 . . . Moving device, 21 . . . Support base, 22 . . . Support portion, 25 . . . Shower, 30 . . . Flow device, 31 . . . Shaft, 32 . . . Propeller, 100 . . . Cooling tank, 101 . . . Cooling tank, 102 . . . Cooling Tank, 103 . . . Tank, 200 . . . Inflow passage, 250 . . . Shower

The invention claimed is:

1. A quenching method in which an object to be treated that is a quenching target is cooled with a quenching coolant that is a coolant for quenching, wherein
  the object to be treated is moved inside the quenching coolant accumulated in a cooling tank, by a moving device for moving the object to be treated, and
  at least from when the object to be treated comes into contact with the quenching coolant until a surface of the object to be treated undergoes martensitic transformation, a speed of the moving device is controlled to synchronize with a predetermined flow speed of the quench coolant.

2. The quenching method according to claim 1, wherein auxiliary cooling is performed by applying an auxiliary coolant on the object to be treated, in which the auxiliary coolant is a coolant for auxiliary cooling discharged from a plurality of nozzles, and after the auxiliary cooling of the object to be treated is stopped before the surface of the object to be treated reaches a martensitic transformation start temperature, the object to be treated is cooled to a temperature equal to or lower than the martensitic transformation start temperature by the quenching coolant.

3. The quenching method according to claim 2, wherein the auxiliary coolant and the quenching coolant are a coolant containing water as a main component or a quenching oil.

4. The quenching method according to claim 2, wherein the auxiliary coolant and the quenching coolant are either both coolants containing water as a main component or both quenching oils.

5. The quenching method according to claim 1, wherein the object to be treated is pre-cooled by a gaseous pre-coolant before the object to be treated is cooled by the quenching coolant.

6. The quenching method according to claim 1, wherein the moving device includes a support base on which the object to be treated is placed and a support portion that supports the base, and
  the speed of the moving device is controlled by controlling a motor connected to the support portion, which controls the raising and lowering speed of the support base.

7. The quenching method according to claim 1, wherein the speed of the moving device is controlled to match a control target amount of direction and the predetermined flow speed of the quench coolant.

8. The quenching method according to claim 1, further comprising determining a state in which the surface of the object to be treated has undergone martensitic transformation based on whether a predetermined period has elapsed after the object comes into contact with the quenching coolant.

9. The quenching method according to claim 8, wherein the predetermined period is determined based on an predetermined distortion amount of the object.

10. The quenching method according to claim 8, wherein the predetermined period is determined based on a time at which a martensitic fraction of a surface of the object is 28% or more.

11. The quenching method according to claim 8, wherein the speed of the moving device is set to zero when the predetermined period has elapsed.

12. The quenching method according to claim 8, wherein the quenching coolant comprises water or an aqueous solution with water as a primary component.

* * * * *